US012653154B1

(12) United States Patent
Landers et al.

(10) Patent No.: US 12,653,154 B1
(45) Date of Patent: Jun. 16, 2026

(54) WIRELESS LOCATION ASSISTED ZONE GUIDANCE SYSTEM WITH REMOTE ACTIVATION

(71) Applicant: GPSip, Inc., Oshkosh, WI (US)

(72) Inventors: Rodney P. Landers, Stillwater, MN (US); Kevin L. Nieuwsma, Lakeville, MN (US)

( * ) Notice: Subject to any disclaimer, the term of this patent is extended or adjusted under 35 U.S.C. 154(b) by 0 days.

(21) Appl. No.: 18/801,742

(22) Filed: Aug. 12, 2024

Related U.S. Application Data

(60) Provisional application No. 63/519,217, filed on Aug. 11, 2023.

(51) Int. Cl.
A01K 15/02 (2006.01)

(52) U.S. Cl.
CPC .................................. A01K 15/023 (2013.01)

(58) Field of Classification Search
CPC ........................... A01K 15/023; A01K 27/009
See application file for complete search history.

(56) References Cited

U.S. PATENT DOCUMENTS

| | | | |
|---|---|---|---|
| 2,883,255 A | 4/1959 | Anderson | |
| 3,534,337 A | 10/1970 | Martin et al. | |
| 4,393,448 A | 7/1983 | Dunn et al. | |
| 4,590,569 A | 5/1986 | Rogoff et al. | |
| 4,611,209 A | 9/1986 | Lemelson et al. | |
| 4,817,000 A | 3/1989 | Eberhardt | |
| 4,823,366 A | 4/1989 | Williams | |
| 4,898,120 A | 2/1990 | Brose | |
| 4,965,568 A | 10/1990 | Atalla et al. | |
| 4,967,696 A | 11/1990 | Tobias | |
| 4,999,782 A | 3/1991 | BeVan | |

(Continued)

FOREIGN PATENT DOCUMENTS

| | | | |
|---|---|---|---|
| DE | 2020/04011942 U1 | 12/2004 | |
| GB | 2478420 A * | 9/2011 | ........... A01K 15/021 |

(Continued)

OTHER PUBLICATIONS

"Boundary Plus Computer Collar Unit Owner's Manual", Invisible Fence, 10 pages.

(Continued)

*Primary Examiner* — Joshua D Huson
*Assistant Examiner* — Alanna K Peterson
(74) *Attorney, Agent, or Firm* — Albert W. Watkins

(57) ABSTRACT

A fully self-contained location training apparatus monitors the location of an animate being, for exemplary purposes such as a dog, and selectively provides location-dependent stimulation. A communications link is provided between the location training apparatus and a mobile training aid. The mobile training aid is provided with a trigger that, when triggered by an operator, in turn causes the location training apparatus to deliver consistent and predictable training stimuli isolated from direct communication or expression by a human operator. The trigger may comprise a button or voice activation. The stimuli may be constant, or may ramp up over time. The mobile training aid is configured to emulate stimuli provided to the animate being, and will preferably display a map and representation of location of the animate being, together with enablement or display of the trigger button when appropriate.

15 Claims, 5 Drawing Sheets

(56) References Cited

U.S. PATENT DOCUMENTS

| | | | |
|---|---|---|---|
| 5,043,736 A | 8/1991 | Darnell et al. |
| 5,046,453 A | 9/1991 | Vinci |
| 5,067,441 A | 11/1991 | Weinstein |
| 5,132,871 A | 7/1992 | Densham et al. |
| 5,191,341 A | 3/1993 | Gouard et al. |
| 5,351,059 A | 9/1994 | Tsuyuki |
| 5,351,653 A | 10/1994 | Marischen et al. |
| 5,353,744 A | 10/1994 | Custer |
| 5,355,140 A | 10/1994 | Slavin et al. |
| 5,355,511 A | 10/1994 | Hatano et al. |
| 5,381,129 A | 1/1995 | Boardman |
| 5,389,934 A | 2/1995 | Kass |
| 5,408,956 A | 4/1995 | Quigley |
| 5,445,178 A | 8/1995 | Feuer |
| 5,450,329 A | 9/1995 | Tanner |
| 5,460,124 A | 10/1995 | Grimsley et al. |
| 5,491,486 A | 2/1996 | Welles, II et al. |
| 5,533,959 A | 7/1996 | Newman et al. |
| 5,549,412 A | 8/1996 | Malone |
| 5,568,119 A | 10/1996 | Schipper et al. |
| 5,587,904 A | 12/1996 | Ben-Yair et al. |
| 5,594,425 A | 1/1997 | Ladner et al. |
| 5,614,670 A | 3/1997 | Nazarian et al. |
| 5,636,597 A | 6/1997 | Van Curen et al. |
| 5,669,061 A | 9/1997 | Schipper |
| 5,685,786 A | 11/1997 | Dudley |
| 5,687,093 A | 11/1997 | Long et al. |
| 5,719,771 A | 2/1998 | Buck et al. |
| 5,721,685 A | 2/1998 | Holland et al. |
| 5,742,233 A | 4/1998 | Hoffman et al. |
| 5,751,612 A | 5/1998 | Donovan et al. |
| 5,774,876 A | 6/1998 | Woolley et al. |
| 5,777,451 A | 7/1998 | Kobayashi et al. |
| 5,791,294 A | 8/1998 | Manning |
| 5,804,810 A | 9/1998 | Woolley et al. |
| 5,815,077 A | 9/1998 | Christiansen |
| 5,825,283 A | 10/1998 | Camhi |
| 5,857,433 A | 1/1999 | Files |
| 5,868,100 A | 2/1999 | Marsh |
| 5,870,741 A | 2/1999 | Kawabe et al. |
| 5,875,183 A | 2/1999 | Nitadori |
| 5,892,454 A | 4/1999 | Schipper et al. |
| 5,900,736 A | 5/1999 | Sovik et al. |
| 5,905,461 A | 5/1999 | Neher |
| 5,911,199 A | 6/1999 | Farkas et al. |
| 5,933,079 A | 8/1999 | Frink |
| 5,947,636 A | 9/1999 | Mara |
| 5,949,350 A | 9/1999 | Girard et al. |
| 5,952,561 A | 9/1999 | Jaselskis et al. |
| 5,959,568 A | 9/1999 | Woolley |
| 5,959,577 A | 9/1999 | Fan et al. |
| 5,963,130 A | 10/1999 | Schlager et al. |
| 5,978,749 A | 11/1999 | Likins, Jr. et al. |
| 5,982,291 A | 11/1999 | Williams et al. |
| 5,986,604 A | 11/1999 | Nichols et al. |
| 6,016,713 A | 1/2000 | Hale |
| 6,041,582 A | 3/2000 | Tiede et al. |
| 6,043,747 A | 3/2000 | Altenhofen |
| 6,043,748 A | 3/2000 | Touchton et al. |
| 6,072,396 A | 6/2000 | Gaukel |
| 6,079,367 A | 6/2000 | Stapelfeld et al. |
| 6,100,806 A | 8/2000 | Gaukel |
| 6,114,957 A | 9/2000 | Westrick et al. |
| 6,122,601 A | 9/2000 | Swanson et al. |
| 6,172,640 B1 | 1/2001 | Durst et al. |
| 6,173,321 B1 | 1/2001 | Peterson et al. |
| 6,184,790 B1 | 2/2001 | Gerig |
| 6,225,890 B1 | 5/2001 | Murphy |
| 6,230,661 B1 | 5/2001 | Yarnall, Jr. et al. |
| 6,232,874 B1 | 5/2001 | Murphy |
| 6,232,880 B1 | 5/2001 | Anderson et al. |
| 6,232,916 B1 | 5/2001 | Grillo et al. |
| 6,236,358 B1 | 5/2001 | Durst et al. |
| 6,239,700 B1 | 5/2001 | Hoffman et al. |
| 6,263,836 B1 | 7/2001 | Hollis |
| 6,271,757 B1 | 8/2001 | Touchton et al. |
| 6,292,725 B1 | 9/2001 | Kageyama et al. |
| 6,301,551 B1 | 10/2001 | Piscalko et al. |
| 6,311,644 B1 | 11/2001 | Pugh |
| 6,313,791 B1 | 11/2001 | Klanke |
| 6,320,933 B1 | 11/2001 | Grodzins et al. |
| 6,353,390 B1 | 3/2002 | Beri et al. |
| 6,362,778 B2 | 3/2002 | Neher |
| 6,388,612 B1 | 5/2002 | Neher |
| 6,404,338 B1 | 6/2002 | Koslar |
| 6,415,742 B1 | 7/2002 | Lee et al. |
| 6,421,001 B1 | 7/2002 | Durst et al. |
| 6,421,608 B1 | 7/2002 | Motoyama et al. |
| 6,431,122 B1 | 8/2002 | Westrick et al. |
| 6,434,372 B1 | 8/2002 | Neagley et al. |
| 6,437,743 B1 | 8/2002 | Mintz et al. |
| 6,441,778 B1 | 8/2002 | Durst et al. |
| 6,480,147 B2 | 11/2002 | Durst et al. |
| 6,484,079 B2 | 11/2002 | Buckelew et al. |
| 6,487,992 B1 | 12/2002 | Hollis |
| 6,497,153 B1 | 12/2002 | Hoskinson et al. |
| 6,518,919 B1 | 2/2003 | Durst et al. |
| 6,519,530 B2 | 2/2003 | Crockett et al. |
| 6,520,715 B1 | 2/2003 | Smith |
| 6,561,137 B2 | 5/2003 | Oakman |
| 6,577,141 B2 | 6/2003 | Gandrud |
| 6,581,546 B1 | 6/2003 | Dalland et al. |
| 6,600,422 B2 | 7/2003 | Barry et al. |
| 6,624,754 B1 | 9/2003 | Hoffman et al. |
| 6,657,544 B2 | 12/2003 | Barry et al. |
| 6,700,492 B2 | 3/2004 | Touchton et al. |
| 6,700,533 B1 | 3/2004 | Werb et al. |
| 6,711,535 B2 | 3/2004 | Ford et al. |
| 6,718,248 B2 | 4/2004 | Lu et al. |
| 6,747,555 B2 | 6/2004 | Fellenstein et al. |
| 6,748,902 B1 | 6/2004 | Boesch et al. |
| 6,762,684 B1 | 7/2004 | Camhi |
| 6,838,991 B2 | 1/2005 | Frankewich, Jr. |
| 6,847,892 B2 | 1/2005 | Zhou et al. |
| 6,857,016 B1 | 2/2005 | Motoyama et al. |
| 6,859,171 B2 | 2/2005 | Durst et al. |
| 6,868,100 B2 | 3/2005 | Larson et al. |
| 6,892,131 B2 | 5/2005 | Coffee et al. |
| 6,903,682 B1 | 6/2005 | Maddox |
| 6,915,216 B2 | 7/2005 | Troxler et al. |
| 6,919,803 B2 | 7/2005 | Breed |
| 6,923,146 B2 | 8/2005 | Kobitz et al. |
| 6,943,701 B2 | 9/2005 | Zeineh |
| 6,961,659 B2 | 11/2005 | Motoyama et al. |
| RE38,910 E | 12/2005 | Troxler et al. |
| 6,995,667 B2 | 2/2006 | He et al. |
| 7,000,570 B2 | 2/2006 | Napolez et al. |
| 7,002,472 B2 | 2/2006 | Stratmoen et al. |
| 7,015,817 B2 | 3/2006 | Copley et al. |
| 7,034,683 B2 | 4/2006 | Ghazarian |
| 7,034,695 B2 | 4/2006 | Troxler |
| 7,038,590 B2 | 5/2006 | Hoffman et al. |
| 7,061,385 B2 | 6/2006 | Fong et al. |
| 7,113,126 B2 | 9/2006 | Durst et al. |
| 7,142,167 B2 | 11/2006 | Rochelle et al. |
| 7,164,354 B1 | 1/2007 | Panzer |
| 7,164,986 B2 | 1/2007 | Humphries et al. |
| 7,171,187 B2 | 1/2007 | Haave et al. |
| 7,173,535 B2 | 2/2007 | Bach et al. |
| 7,196,621 B2 | 3/2007 | Kochis |
| 7,219,024 B2 | 5/2007 | Gamache et al. |
| 7,236,798 B2 | 6/2007 | Beuck |
| 7,239,150 B2 | 7/2007 | Troxler et al. |
| 7,259,718 B2 | 8/2007 | Patterson et al. |
| 7,313,759 B2 | 12/2007 | Sinisi |
| 7,319,397 B2 | 1/2008 | Chung et al. |
| RE40,073 E | 2/2008 | Breed |
| 7,328,671 B2 | 2/2008 | Kates |
| 7,345,588 B2 | 3/2008 | Gerig |
| 7,376,457 B2 | 5/2008 | Ross |
| 7,376,530 B2 | 5/2008 | Bienvenu et al. |
| 7,385,499 B2 | 6/2008 | Horton et al. |
| 7,394,390 B2 | 7/2008 | Gerig |
| 7,441,516 B2 | 10/2008 | Sharpe |

(56)         References Cited

U.S. PATENT DOCUMENTS

| | | |
|---|---|---|
| 7,468,659 B2 | 12/2008 | Haave et al. |
| 7,477,155 B2 | 1/2009 | Bach et al. |
| 7,512,493 B2 | 3/2009 | Morgan et al. |
| 7,518,522 B2 | 4/2009 | So |
| 7,538,679 B2 | 5/2009 | Shanks |
| 7,554,441 B2 | 6/2009 | Viegers et al. |
| 7,663,502 B2 | 2/2010 | Breed |
| 7,664,483 B2 | 2/2010 | Annoni et al. |
| 7,677,204 B1 | 3/2010 | James |
| 7,707,085 B2 | 4/2010 | Sakurai et al. |
| 7,764,228 B2 | 7/2010 | Durst et al. |
| 7,786,876 B2 | 8/2010 | Troxler |
| 7,801,506 B2 | 9/2010 | Haave et al. |
| 7,822,817 B2 | 10/2010 | Motoyama et al. |
| 7,830,257 B2 | 11/2010 | Hassell |
| 7,848,905 B2 | 12/2010 | Troxler et al. |
| 7,856,947 B2 | 12/2010 | Giunta |
| 7,920,066 B2 | 4/2011 | Troxler |
| 7,955,513 B2 | 6/2011 | Carr |
| 7,961,094 B2 | 6/2011 | Breed |
| 8,065,074 B1 | 11/2011 | Liccardo |
| 8,112,242 B2 | 2/2012 | Troxler |
| 8,115,642 B2 | 2/2012 | Thompson et al. |
| 8,149,110 B2 | 4/2012 | Troxler |
| 8,155,871 B2 | 4/2012 | Lohi et al. |
| 8,159,338 B2 | 4/2012 | Breed |
| 8,237,575 B2 | 8/2012 | Maclean, III et al. |
| 8,274,396 B2 | 9/2012 | Gurley et al. |
| 8,291,867 B2 | 10/2012 | Blizzard |
| 8,297,233 B2 | 10/2012 | Rich et al. |
| 8,428,913 B2 | 4/2013 | Troxler |
| 8,531,289 B2 | 9/2013 | Scalisi et al. |
| 8,571,671 B2 | 10/2013 | Shah et al. |
| 8,624,723 B2 | 1/2014 | Troxler |
| 8,726,846 B2 | 5/2014 | Dutcher et al. |
| 8,726,847 B2 | 5/2014 | Gurley et al. |
| 8,757,098 B2 | 6/2014 | So et al. |
| 8,779,925 B2 | 7/2014 | Rich et al. |
| 8,797,141 B2 | 8/2014 | Best et al. |
| 8,838,260 B2 | 9/2014 | Pachet et al. |
| 8,839,744 B1 | 9/2014 | Bianchi et al. |
| 8,851,019 B2 | 10/2014 | Jesurum |
| 8,955,462 B1 | 2/2015 | Golden |
| 8,957,812 B1 | 2/2015 | Hill et al. |
| 9,015,231 B1 | 4/2015 | Hodgman et al. |
| 9,072,278 B2 | 7/2015 | Chortyk-White et al. |
| 9,101,113 B2 | 8/2015 | Rich et al. |
| 9,137,971 B2 | 9/2015 | Gurley et al. |
| 9,161,515 B2 | 10/2015 | Dutcher et al. |
| 9,226,479 B2 | 1/2016 | Bianchi et al. |
| 9,265,015 B2 | 2/2016 | Aiuto et al. |
| 9,326,486 B2 | 5/2016 | Namm |
| 9,332,734 B1 | 5/2016 | Hege |
| 9,439,396 B2 | 9/2016 | Namm |
| 9,538,329 B1 | 1/2017 | Vivathana |
| 9,552,736 B2 | 1/2017 | Taveira |
| 9,615,545 B2 | 4/2017 | Rich et al. |
| 9,640,079 B1 | 5/2017 | Moravek et al. |
| 9,648,849 B1 | 5/2017 | Vivathana |
| 9,654,925 B1 | 5/2017 | Solinsky et al. |
| 9,674,684 B1 | 6/2017 | Mendelson |
| 9,728,089 B2 | 8/2017 | Marcus |
| 9,795,118 B2 | 10/2017 | Landers et al. |
| 9,848,295 B1 | 12/2017 | Mason et al. |
| 9,922,522 B2 | 3/2018 | Solinsky et al. |
| 9,924,314 B2 | 3/2018 | Solinsky et al. |
| 9,961,884 B1 | 5/2018 | Landers et al. |
| 10,034,459 B1 * | 7/2018 | Scanlan ............... A01K 15/025 |
| 10,064,390 B1 | 9/2018 | Landers et al. |
| 10,080,346 B2 | 9/2018 | Landers et al. |
| 10,092,203 B2 | 10/2018 | Mirov |
| 10,154,651 B2 | 12/2018 | Goetzl et al. |
| 10,165,755 B1 | 1/2019 | Landers et al. |
| 10,165,756 B1 | 1/2019 | Landers et al. |
| 10,172,325 B1 | 1/2019 | Landers et al. |
| 10,182,964 B2 | 1/2019 | Snow |
| 10,231,440 B2 | 3/2019 | Seltzer et al. |
| 10,251,371 B1 | 4/2019 | Landers et al. |
| 10,268,220 B2 | 4/2019 | McFarland et al. |
| 10,292,365 B1 | 5/2019 | Landers et al. |
| 10,342,218 B1 | 7/2019 | Landers et al. |
| 10,405,520 B2 | 9/2019 | Landers et al. |
| 10,455,810 B1 | 10/2019 | Landers et al. |
| 10,470,437 B1 | 11/2019 | Landers et al. |
| 10,514,439 B2 | 12/2019 | Seltzer |
| 10,624,319 B2 | 4/2020 | Landers et al. |
| 10,645,908 B2 | 5/2020 | Seltzer et al. |
| 10,674,709 B2 | 6/2020 | Goetzl et al. |
| 10,820,575 B2 | 11/2020 | Landers et al. |
| 10,842,128 B2 | 11/2020 | McFarland |
| 10,893,662 B1 | 1/2021 | Landers et al. |
| 10,918,087 B2 | 2/2021 | Respass et al. |
| 10,986,813 B2 | 4/2021 | Seltzer et al. |
| 11,019,807 B1 | 6/2021 | Landers et al. |
| 11,109,182 B2 | 8/2021 | Floyd et al. |
| 11,238,889 B2 | 2/2022 | Seltzer et al. |
| 11,246,291 B1 * | 2/2022 | Landers ............... A01K 15/021 |
| 11,330,803 B2 | 5/2022 | Ehrman et al. |
| 11,372,077 B2 | 6/2022 | Seltzer et al. |
| 11,394,196 B2 | 7/2022 | Olszyk et al. |
| 11,470,814 B2 | 10/2022 | Goetzl et al. |
| 11,490,597 B2 | 11/2022 | Seltzer et al. |
| 11,516,994 B1 | 12/2022 | Landers |
| 11,553,692 B2 | 1/2023 | Goetzl et al. |
| 11,713,968 B2 | 8/2023 | Landers |
| 12,004,485 B1 | 6/2024 | Landers et al. |
| 12,007,490 B2 | 6/2024 | Landers |
| 2001/0026240 A1 | 10/2001 | Neher |
| 2002/0015354 A1 | 2/2002 | Buckelew |
| 2002/0017995 A1 | 2/2002 | Touchton |
| 2002/0152028 A1 | 10/2002 | Motoyama et al. |
| 2002/0180618 A1 | 12/2002 | Beri et al. |
| 2002/0196151 A1 | 12/2002 | Troxler |
| 2003/0179140 A1 | 9/2003 | Patterson et al. |
| 2003/0184450 A1 | 10/2003 | Muller et al. |
| 2003/0224772 A1 | 12/2003 | Patzer et al. |
| 2004/0036649 A1 | 2/2004 | Yaylor |
| 2004/0108939 A1 | 6/2004 | Giunta |
| 2004/0196182 A1 | 10/2004 | Unnold |
| 2005/0034683 A1 | 2/2005 | Giunta |
| 2005/0035865 A1 | 2/2005 | Brennan et al. |
| 2005/0066912 A1 | 3/2005 | Korbitz et al. |
| 2005/0143909 A1 | 6/2005 | Orwant |
| 2005/0280546 A1 | 12/2005 | Ganley et al. |
| 2006/0027185 A1 | 2/2006 | Troxler |
| 2006/0061469 A1 | 3/2006 | Jaeger et al. |
| 2006/0112901 A1 | 6/2006 | Gomez |
| 2006/0191491 A1 | 8/2006 | Nottingham et al. |
| 2006/0197672 A1 | 9/2006 | Talamas, Jr. et al. |
| 2007/0171047 A1 | 7/2007 | Goodman et al. |
| 2007/0204804 A1 | 9/2007 | Swanson et al. |
| 2007/0219705 A1 | 9/2007 | Bitar et al. |
| 2007/0229350 A1 | 10/2007 | Scalisi et al. |
| 2008/0036594 A1 | 2/2008 | Kates |
| 2008/0036610 A1 | 2/2008 | Hokuf et al. |
| 2008/0055154 A1 | 3/2008 | Martucci et al. |
| 2008/0156277 A1 | 7/2008 | Mainini et al. |
| 2008/0162034 A1 | 7/2008 | Breen |
| 2008/0186167 A1 | 8/2008 | Ramachandra |
| 2008/0186197 A1 | 8/2008 | Rochelle et al. |
| 2008/0216766 A1 | 9/2008 | Martin et al. |
| 2008/0246656 A1 | 10/2008 | Ghazarian |
| 2008/0252527 A1 | 10/2008 | Garcia |
| 2008/0278309 A1 | 11/2008 | Troxler |
| 2009/0002188 A1 | 1/2009 | Greenberg |
| 2009/0102668 A1 * | 4/2009 | Thompson ........... A01K 15/023 340/573.3 |
| 2009/0120373 A1 * | 5/2009 | Wetzel ................. A01K 15/021 119/719 |
| 2009/0267832 A1 | 10/2009 | Hymel |
| 2009/0289844 A1 | 11/2009 | Palsgrove et al. |
| 2009/0292426 A1 | 11/2009 | Nelson et al. |
| 2009/0325594 A1 | 12/2009 | Lan et al. |
| 2010/0033339 A1 | 2/2010 | Gurley et al. |

(56) References Cited

U.S. PATENT DOCUMENTS

| | | |
|---|---|---|
| 2010/0139576 A1 | 6/2010 | Kim et al. |
| 2011/0148634 A1 | 6/2011 | Putz |
| 2011/0163873 A1 | 7/2011 | McIntosh |
| 2011/0172916 A1 | 7/2011 | Pakzad et al. |
| 2011/0187537 A1 | 8/2011 | Touchton et al. |
| 2011/0193706 A1 | 8/2011 | Dickerson |
| 2011/0193717 A1 | 8/2011 | Troxler |
| 2011/0298615 A1 | 12/2011 | Rich et al. |
| 2012/0000431 A1 | 1/2012 | Khoshkish |
| 2012/0132151 A1 | 5/2012 | Touchton et al. |
| 2012/0154154 A1 | 6/2012 | Troxler |
| 2012/0220314 A1 | 8/2012 | Altman et al. |
| 2012/0312250 A1 | 12/2012 | Jesurum |
| 2013/0008391 A1 | 1/2013 | Berntsen |
| 2013/0127658 A1 | 5/2013 | McFarland et al. |
| 2013/0141237 A1 | 6/2013 | Goetzl et al. |
| 2013/0157628 A1 | 6/2013 | Kim et al. |
| 2013/0226511 A1 | 8/2013 | Troxler |
| 2013/0265165 A1 | 10/2013 | So |
| 2013/0307688 A1 | 11/2013 | Hoffman et al. |
| 2013/0324166 A1 | 12/2013 | Mian et al. |
| 2014/0020635 A1 | 1/2014 | Sayers et al. |
| 2014/0104063 A1 | 4/2014 | Troxler |
| 2014/0120943 A1 | 5/2014 | Shima |
| 2014/0230755 A1 | 8/2014 | Trenkle et al. |
| 2014/0232541 A1 | 8/2014 | Trenkle et al. |
| 2014/0251233 A1 | 9/2014 | Bianchi et al. |
| 2014/0290013 A1 | 10/2014 | Eidelman et al. |
| 2014/0302842 A1 | 10/2014 | Lloyd et al. |
| 2015/0016730 A1 | 1/2015 | Miller et al. |
| 2015/0020750 A1 | 1/2015 | Jesurum |
| 2015/0040839 A1 | 2/2015 | Goetzl et al. |
| 2015/0107531 A1 | 4/2015 | Golden |
| 2015/0121535 A1 | 4/2015 | Fiss |
| 2015/0177010 A1 | 6/2015 | Abramson et al. |
| 2015/0216142 A1 | 8/2015 | Landers et al. |
| 2016/0015004 A1 | 1/2016 | Bonge |
| 2016/0021506 A1* | 1/2016 | Bonge, Jr. .............. G16H 40/67 |
| | | 717/173 |
| 2016/0021849 A1 | 1/2016 | Loosveld |
| 2016/0022185 A1 | 1/2016 | Agarwal et al. |
| 2016/0026837 A1 | 1/2016 | Good et al. |
| 2016/0135431 A1 | 5/2016 | Sheldon et al. |
| 2016/0189507 A1 | 6/2016 | Rayner |
| 2016/0195602 A1 | 7/2016 | Meadow |
| 2016/0205898 A1 | 7/2016 | Perrine |
| 2016/0286760 A1 | 10/2016 | Manguette |
| 2016/0371984 A1 | 12/2016 | Macfarlane et al. |
| 2017/0099807 A1 | 4/2017 | Northrop et al. |
| 2017/0156294 A1 | 6/2017 | Landers et al. |
| 2017/0265432 A1* | 9/2017 | Anderton ............. A01K 15/029 |
| 2017/0295143 A1 | 10/2017 | Bone et al. |
| 2017/0337826 A1 | 11/2017 | Moran et al. |
| 2017/0372580 A1 | 12/2017 | Vivathana |
| 2017/0372581 A1 | 12/2017 | Solinsky et al. |
| 2017/0374510 A1 | 12/2017 | Solinsky et al. |
| 2018/0055011 A1 | 3/2018 | Landers et al. |
| 2018/0184618 A1* | 7/2018 | Gotts ................... A01K 27/009 |
| 2019/0021283 A1 | 1/2019 | Landers et al. |
| 2019/0113625 A1 | 4/2019 | Farmer et al. |
| 2019/0120929 A1 | 4/2019 | Meadow |
| 2019/0133084 A1 | 5/2019 | Landers et al. |
| 2019/0141951 A1 | 5/2019 | Coughlan |
| 2019/0141953 A1 | 5/2019 | Landers et al. |
| 2019/0281794 A1 | 9/2019 | Ehrman et al. |
| 2020/0093096 A1 | 3/2020 | Blizzard |
| 2020/0351623 A1 | 11/2020 | Eisner |
| 2021/0045353 A1 | 2/2021 | Ehrman et al. |
| 2021/0080595 A1 | 3/2021 | Landers |
| 2021/0084480 A1 | 3/2021 | Maier et al. |
| 2021/0190503 A1 | 6/2021 | Landers |
| 2022/0066045 A1 | 3/2022 | Farmer et al. |
| 2022/0159932 A1 | 5/2022 | Takada Neff |
| 2022/0201977 A1* | 6/2022 | Bland .................. A01K 27/001 |
| 2023/0371474 A1* | 11/2023 | Rabiean ............... G06F 3/0488 |
| 2023/0380381 A1* | 11/2023 | Metcalfe ............... A01K 15/02 |
| 2024/0003690 A1 | 1/2024 | Landers |

FOREIGN PATENT DOCUMENTS

| | | |
|---|---|---|
| WO | WO 9427268 A1 | 11/1994 |
| WO | WO 2005064358 A1 | 7/2005 |
| WO | WO 2015142962 A1 | 9/2015 |
| WO | WO 2019182919 A1 | 9/2019 |
| WO | WO 2020142089 A1 | 7/2020 |
| WO | WO 2020145941 A1 | 7/2020 |
| WO | WO 2021055883 A2 | 3/2021 |
| WO | WO-2023111868 A1 * | 6/2023 ........... A01K 11/008 |

OTHER PUBLICATIONS

"Global Pet Finder GPS Pet Tracker", http://www.amazon.com/Global-Pet-Finder-GPS-Tracker/, Nov. 19, 2013, 5 pages.
"Tagg—The Pet Tracker Master Kit, White by Snaptracs, Inc.", http://www.amazon.com/TAGG-The-Pet-Tracker-Guard/, Nov. 19, 2013, 5 pages.
"Boundary Plus", http://www.invisiblefence.com/find-the-right-solution/, Jan. 29, 2013, 3 pages.
"Lookup_table", http://www.Wikipedia.org/wiki/Lookup_table, Feb. 15, 2013, 10 pages.
"SkyFence: Our_Product", http://www.gpspetfence.homestead.com/resources.html, Jan. 29, 2013, 3 pages.
"SkyFence: Purchase", http://www.gpspetfence.homestead.com/Purchase.html, Jan. 29, 2013, 2 pages.
"Tagg: About US", http://www.pettracker.com/about-tagg, Jan. 29, 2013, 1 page.
"Kalman Filter", Wikipedia, https://en.wikipedia.org/wiki/Kalman_filter, Jan. 18, 2016, 37 pages.
Skinner, B. F., "Superstition in the Pigeon", Journal of Experimental Psychology, vol. 38, pp. 168-172, 1948.

\* cited by examiner

WIRELESS LOCATION ASSISTED ZONE GUIDANCE SYSTEM WITH REMOTE ACTIVATION

CROSS REFERENCE TO RELATED APPLICATIONS

The present application claims the benefit of U.S. provisional patent application 63/519,217 filed Aug. 11, 2023 of like title and inventorship, the teachings and entire contents which are incorporated herein by reference.

BACKGROUND OF THE INVENTION

1. Field of the Invention

This invention pertains generally to condition responsive indicating systems with a radio link. In one manifestation, a fully self-contained collar, band, or similar or equivalent accessory hereinafter generically referred to as a collar monitors the location of an animate being, for exemplary and non-limiting purposes such as a dog. A communications link is provided between the collar and a personal portable device. The personal portable device is provided with a trigger or other activator that, when triggered by an operator, in turn causes the collar to deliver consistent and predictable training stimuli, again for exemplary purposes to the dog. The personal portable device may then be used to provide stimuli to the animate being, such as when teaching new commands or while hunting, or for other purposes. In some preferred manifestations of the present invention, stimuli from the collar are converted to visual, auditory, and tactile feedback within the separate personal portable device. For exemplary and non-limiting purpose, this enables an operator to validate the intended or desired operation of the collar in active use, including representations of variable magnitude stimuli.

In some manifestations, the collar also is provisioned with a plurality of zones within which well defined and positive stimuli are provided to train an animate being to stay within a predetermined area, and to shepherd a wayward being such as a dog back to the predetermined area.

2. Description of the Related Art

Dogs are well known as "man's best friend" owing to the many beneficial services that they provide. However, and likely since mankind first befriended dogs, there has existed a need to teach the dog to perform various actions. There are many reasons that motivate this need, many which may be relatively unique to a particular dog or owner, and other reasons that are far more universal.

Controlling the actions of a pet such as a dog in a simple form can comprise a whistle, treats, a clicker, or many other simple tools, and often requires additional things be brought with to encourage the dog to act according to the wishes of the owner. To facilitate training, various training collars have been devised that allow a person to communicate with the dog through various stimulation means from great distances, often beyond any audible range or visual sight lines. Unfortunately, these prior art training collars often have that sole functionality. This means that the training collar is usually affixed next to a leash collar, since the leash collar will commonly provide both a leash coupling point and support for dog tags that can identify emergency contacts if the pet and person become separated. While it might be tempting to simply move the dog tags and the like to the training collar, the size of the necessary batteries on the training collar add substantial and undesirable bulk, and the training collar still needs removed frequently to recharge.

In the event a person such as the owner would further like to keep the dog within a space, or provide locating coordinates in the event the pet leaves a safe space, a containment or locating collar is additionally required, bringing the collar count to three. Various artisans have proposed electronic apparatus that provide more flexibility and capability for containment and locating than mechanical apparatus. Among these devices are buried or above ground transmitter antennas combined with radio collars that either: detect the crossing of a buried line, detect the reception or absence of reception of a signal broadcast by the transmitter antenna, or perform triangulation or time-of-flight calculations with fixed transmitters. When an undesirable location is detected, the radio collar is then triggered to provide stimulation to the dog. Desirably, the stimulation is mild enough not to harm the dog, and yet is still strong enough to gain the dog's attention and lead to desirable behavior. These systems remove the physical link between a dog and a static structure, meaning the dog will not get tangled in obstacles when moving about. Further, in many configurations the safe area may follow irregular shapes and patterns of land, and so is not limited to a circular pattern limited by a particular radius. However, those systems fail to provide an adequate and desirable integrated training aid.

The following patents and published patent applications are believed to be exemplary of the most relevant prior art, and the teachings and contents of each are incorporated herein by reference: 4,393,448 by Dunn et al, entitled "Navigational plotting system"; 4,590,569 by Rogoff et al, entitled "Navigation system including an integrated electronic chart display"; 4,611,209 by Lemelson et al, entitled "Navigation warning system and method"; 4,817,000 by Eberhardt, entitled "Automatic guided vehicle system"; 4,999,782 by BeVan, entitled "Fixed curved path waypoint transition for aircraft"; 5,067,441 by Weinstein, entitled "Electronic assembly for restricting animals to defined areas"; 5,191,341 by Gouard et al, entitled "System for sea navigation or traffic control/assistance"; 5,351,653 by Marischen et al, entitled "Animal training method using positive and negative audio stimuli"; 5,353,744 by Custer, entitled "Animal control apparatus"; 5,355,511 by Hatano et al, entitled "Position monitoring for communicable and uncommunicable mobile stations"; 5,381,129 by Boardman, entitled "Wireless pet containment system"; 5,389,934 by Kass, entitled "Portable locating system"; 5,408,956 by Quigley, entitled "Method and apparatus for controlling animals with electronic fencing"; 5,450,329 by Tanner, entitled "Vehicle location method and system"; 5,460,124 by Grimsley et al, entitled "Receiver for an electronic animal confinement system"; 5,568,119 by Schipper et al, entitled "Arrestee monitoring with variable site boundaries"; 5,587, 904 by Ben-Yair et al, entitled "Air combat monitoring system and methods and apparatus useful therefor"; 5,594, 425 by Ladner et al, entitled "Locator device"; 5,751,612 by Donovan et al, entitled "System and method for accurate and efficient geodetic database retrieval"; 5,791,294 by Manning, entitled "Position and physiological data monitoring and control system for animal herding"; 5,857,433 by Files, entitled "Animal training and tracking device having global positioning satellite unit"; 5,868,100 by Marsh, entitled "Fenceless animal control system using GPS location information"; 5,911,199 by Farkas et al, entitled "Pressure sensitive animal training device"; 5,949,350 by Girard et al, entitled "Location method and apparatus"; 6,043,748 by Touchton et al, entitled "Satellite relay collar and programmable electronic boundary system for the containment of animals"; 6,114,957 by Westrick et al, entitled "Pet locator system"; 6,172,640 by Durst et al, entitled "Pet locator"; 6,232,880 by Anderson et al, entitled "Animal control system using global positioning and instrumental animal conditioning"; 6,232,916 by Grillo et al, entitled "GPS restraint system and method for confining a subject within a defined area"; 6,236,358 by Durst et al, entitled "Mobile object locator"; 6,263,836 by Hollis, entitled "Dog behavior monitoring and training apparatus"; 6,271,757 by Touchton et al, entitled "Satellite animal containment system with programmable Boundaries"; 6,313,791 by Klanke, entitled "Automotive GPS control system"; 6,421,001 by Durst et al, entitled "Object locator"; 6,441,778 by Durst et al, entitled "Pet locator"; 6,480,147 by Durst et al, entitled "Portable position determining device"; 6,487,992 by Hollis, entitled "Dog behavior monitoring and training apparatus"; 6,518,919 by Durst et al, entitled "Mobile object locator"; 6,561,137 by Oakman, entitled "Portable electronic multi-sensory animal containment and tracking device"; 6,581,546 by Dalland et al, entitled "Animal containment system having a dynamically changing perimeter"; 6,700,492 by Touchton et al, entitled "Satellite animal containment system with programmable boundaries"; 6,748,902 by Boesch et al, entitled "System and method for training of animals"; 6,903,682 by Maddox, entitled "DGPS animal containment system"; 6,923,146 by Kobitz et al, entitled "Method and apparatus for training and for constraining a subject to a specific area"; 7,034,695 by Troxler, entitled "Large area position/proximity correction device with alarms using (D)GPS technology"; 7,259,718 by Patterson et al, entitled "Apparatus and method for keeping pets in a defined boundary having exclusion areas"; 7,328,671 by Kates, entitled "System and method for computer-controlled animal toy"; 7,677,204 by James, entitled "Dog training device"; 8,155,871 by Lohi et al, entitled "Method, device, device arrangement and computer program for tracking a moving object"; 8,115,942 by Thompson et al, entitled "Traveling invisible electronic containment perimeter—method and apparatus"; 8,624,723 by Troxler, entitled "Position and proximity detection systems and methods"; 8,757,098 by So et al, entitled "Remote animal training system using voltage-to-frequency conversion"; 8,797,141 by Best et al, entitled "Reverse RFID location system"; 8,839,744 by Bianchi et al, entitled "Mobile telephone dog training tool and method"; 8,851,019 by Jesurum, entitled "Pet restraint system"; 2007/0204804 by Swanson et al, entitled "GPS pet containment system and method"; 2008/0252527 by Garcia, entitled "Method and apparatus for acquiring local position and overlaying information"; 2011/0193706 by Dickerson, entitled "Sensor collar system"; 2012/0000431 by Khoshkish, entitled "Electronic pet containment system"; 2013/0127658 by mcFarlane et al, entitled "Method and apparatus to determine actionable position and speed in GNUS applications"; and EP 0699330 and WO 94/27268 by Taylor, entitled "GPS Explorer".

As apparent from the foregoing, a number of such systems have been devised in the prior art, though many suffer from a number of deficiencies. One particular limitation of many of the prior art systems is the degree and nature of the stimulation. Most prior art electronic fences and collars have attempted to train an animal using punishment, such as a strong, harmful, and often even necrotizing electric shock to elicit a desired behavior. As is very well known and established, negative reinforcement is less effective than positive reinforcement or a combination of positive and negative reinforcement. Furthermore, the type of reinforcement can also affect the temperament of the animal. This need for aversive treatment is often believed to be required, at least in part, due to the equally harsh construction of a boundary. The prior art structural fence evolved into an electronic fence that provided a harsh and distinct border which the animal was never supposed to cross. Flags were set up to provide visual cues to the animal that identified the border location. However, the natural instincts of many animals are to wander and explore. This harsh border provides little or no warning to an exploring animal, and, as noted herein below, dependent upon the technology used to implement a system this border may even move with respect to a fixed land location. The combination of harsh punishment and unpredictable borders can literally destroy the psychological well-being of the animal. Consequently, it is desirable to not only provide consistent behavioral reinforcement, but also to provide that reinforcement in a positive manner. Furthermore, due to the severity of the reinforcement utilizing the negative reinforcement of the collar for anything other than border training is undesirable as it provides excessive negative feedback.

Another limitation of the prior art location systems is the required battery size and expected battery life. Most complex GPS, triangulation, and time-of-flight systems require substantial calculations that must be performed very quickly and frequently, thereby requiring both large batteries and frequent charging, sometimes demanding recharging intervals measured in a few hours. Limited battery life and excessive battery size both severely limit the applications that are suitable for such systems.

Some artisans have devised different ways to trigger a collar. One exemplary published application, the teachings which are incorporated herein by reference, is 2016/0286760 by Manguette, entitled "Intelligent hands-free control device for animal training". The Manguette published application describes the use of a ring having a pushbutton switch to trigger a remote control, the remote control that in turn generates a signal for a dog collar. Different sequences and timings of ring pushbutton switch activation generate different stimulation signals. Unfortunately, a trainer must remember these sequences and timings to generate a desired stimulation. Remembering encoding sequences can be a challenge for even an experienced trainer when something critical is happening with the dog. No feedback is provided to the trainer that would allow the trainer to recognize whether a desired stimulation has been generated. In the instantaneous excitement of the moment, it is very easy for a trainer to unintentionally and undesirably convey the wrong message to the dog and not even realize they have done so. As may be appreciated, even one or just a few incorrect messages can set back or destroy hours, weeks, or months of training.

Another exemplary published application, the teachings which are incorporated herein by reference, is 2022/0159932 by Takada Neff, entitled "Methods, devices, and systems for information transfer with significant positions and feedback". The Takada Neff apparatus and system as described appears to be designed to convert gestures to linguistics for interpersonal communications between a trainer and dog. Unfortunately, the complexity of the system and training time required for both a trainer and dog are contrary to ordinary implementations such as required for the replacement of hunting and geofence collars, and there is no description provided that would enlighten a person on how to do so.

The present applicant has developed a system incorporating a number of techniques that are related to the present invention and that are represented in the following granted patents and published applications, the teachings of each which are incorporated herein by reference: U.S. Pat. Nos. 7,677,204; 9,795,118; 9,961,884; 10,064,390; 10,080,346; 10,165,755; 10,165,756; 10,172,325; 10,251,371; 10,292, 365; 10,342,218; 10,405,520; 10,455,810; 10,470,437; 10,624,319; 10,820,575; 10,893,662; 11,019,807; 11,246, 291; 11,516,994; 11,713,968; 12,004,485; and 12,007,490. These overcome many of the limitations of the prior art, for exemplary and non-limiting purpose by providing positive and non-necrotic stimulation, improved resolution and consistency, fur detection, reduced battery consumption, improved shepherding of a wayward animal, and increased security, and so are preferred for implementation in combination with the present invention. A particularly consequential benefit of these commonly owned patents and applications is a disconnection of the land-based training such as created by hard boundaries formed by buried fences or flagged territories. Instead, these commonly owned patents and applications teach a training system that trains the animal to respond to the cues provided by the collar, independent of land features such as fences or flags. As a result, the animal can be properly cued to appropriate behavior at any location, whether the normal "home" territory, or when visiting new locations, or even when moving about dynamically, such as when on a walk or hunting excursion. Nevertheless, the teachings of the present invention will find application with many diverse systems and apparatus of the prior art.

An even further limitation of the prior art is determining whether a system and apparatus are functioning properly and as intended by a person. As is well known, electronic devices have many failure modes. Among these is a complete failure to even power up, rendering a device entirely without function. In many cases, a person will either immediately or quickly recognize this problem, such as through a power indicator light failing to turn on or a required or desired radio connection failing to be established. Nevertheless, there are many other failure modes, as those who have experienced the familiar "check engine" light on an automobile will recognize and understand. Some of these can be quite hard to detect, such as improper boundary detections, or generation of the wrong type of stimulus for a given circumstance. These types of failures can also be very insidious, being both hard to detect and highly destructive to the training of the animal. Even if not a failure mode, but instead confusion of a trainer or operator such as described herein above with respect to the Manguette published application, the lack of feedback to the trainer or operator can have the same unintended consequence as that of a hardware or software failure. Consequently, it is highly desirable to provide a way for a person to test and monitor the operation of a location training system.

Some artisans have devised apparatuses to facilitate the testing of prior art location training systems. Exemplary US patents and published applications, the teachings and contents which are incorporated herein, include: 6,838,991 by Frankewich, Jr, entitled "Method and apparatus for testing an electronic pet containment transmitter"; and 8,779,925 by Rich et al, entitled "Custom-shape wireless dog fence system and method". The Frankewich patent describes a short-range transmitter that is directly coupled with the two prong-style shock electrodes commonly found in prior art shock collars. The short-range transmitter can then emulate a buried wire transmitter loop signal, causing the shock collar to generate a high voltage at the shock electrodes. The short-range transmitter is further electrically connected to the shock electrodes, and can for exemplary purposes then display through visual or audible indicators that the electrodes have generated a shock. While useful, in essence testing the ability of the collar to generate a shock when appropriately triggered by a radio signal without shocking the person testing the collar, there is no additional information to be garnered. In other words, a person will not know where an appropriate warning signal will be generated relative to different locations along the buried wire, nor whether the actual in-ground wire at any given location will provide a sufficient signal to trigger the shock, nor whether there might be locations of strong EMI-RFI that might unintentionally and undesirably trigger the shock collar. Instead, the Frankewich patent simply tests the ability of the dog collar to generate a shock of sufficient voltage when stimulated by a sufficiently strong radio signal.

In the Rich et al patent, software displays a visual representation of a boundary fence as the fence is being defined. A person may subsequently verify the fence location by holding the collar and moving about relative to the fence. The user's walked path is recorded and displayed as a "bread crumb" trail on the computer, thereby allowing the user to confirm that the fence system is properly set up and operational with respect to tracking the location of the collar. The user may also conduct a "breach" test by walking the collar through the fence perimeter. In such instance, the collar "should include an auditory tone and illumination of an LED", and the PC screen will change visually such as by changing the color of the fence displayed on the PC screen. As may be apparent, the Rich et al apparatus provides much greater flexibility and verification than was possible with the Frankewich apparatus. Nevertheless, the collar must provide the auditory tone and LED activation, which depending upon the breach level and circumstance will not represent normal collar functioning. In other words, the breach test is not testing the actual collar functioning and instead is running in a separate software-based test mode, meaning there still remains the possibility that the collar is malfunctioning even when the breach test indicates proper operation. For exemplary purposes only, if the software code during actual operation is defective or "buggy", but the test code is fully functional, then different results will be obtained during the test than would be obtained during actual collar operation.

As may be apparent then, in spite of the many years of containment and location training systems, and the substantial research and development that has been expended, there still remains a need for an improved personal portable device that is provided with a trigger or other activator that, when triggered by an operator, isolates the animate being from direct communication or expression by the human operator and still in turn causes the collar or functionally similar apparatus to deliver consistent and predictable training or other particular stimuli to an animate being.

In addition, there remains a need to more accurately and completely test and verify the intended operation of a location training system in real time. Such a training aid will also desirably provide training to the animal trainer in the type and extent of stimulation that is or will be delivered, allowing the trainer to more precisely select and control the operation of both the location training and conditional training apparatus to suit the needs and desires of the trainer.

Additional patents of varying relevance, the relevant teachings and contents which are incorporated herein by reference, include: 2,883,255 by Anderson; 3,534,337 by Martin et al; 4,823,366 by Williams; 4,898,120 by Brose; 4,965,568 by Atalla et al; 4,967,696 by Tobias; 5,043,736 by Darnell et al; 5,046,453 by Vinci; 5,132,871 by Densham et al; 5,351,059 by Tsuyuki; 5,355,140 by Slavin et al; 5,445,178 by Feuer; 5,491,486 by Welles II et al; 5,533,959 by Newman et al; 5,549,412 by Malone; 5,614,670 by Nazarian et al; 5,636,597 by Van Curen et al; 5,669,061 by Schipper; 5,685,786 by Dudley; 5,687,093 by Long et al; 5,719,771 by Buck et al; 5,721,685 by Holland et al; 5,742,233 by Hoffman et al; 5,774,876 by Woolley et al; 5,777,451 by Kobayashi et al; 5,804,810 by Woolley et al; 5,815,077 by Christiansen; 5,825,283 by Camhi; 5,870,741 by Kawabe et al; 5,875,183 by Nitadori; 5,892,454 by Schipper et al; 5,900,736 by Sovik et al; 5,905,461 by Neher; 5,933,079 by Frink; 5,947,636 by Mara; 5,952,561 by Jaselskis et al; 5,959,568 by Woolley; 5,959,577 by Fan et al; 5,963,130 by Schlager et al; 5,978,749 by Likins, Jr. et al; 5,982,291 by Williams et al; 5,986,604 by Nichols et al; 6,016,713 by Hale; 6,041,582 by Tiede et al; 6,043,747 by Altenhofen; 6,072,396 by Gaukel; 6,079,367 by Stapelfeld et al; 6,100,806 by Gaukel; 6,122,601 by Swanson et al; 6,173,321 by Peterson et al; 6,184,790 by Gerig; 6,225,890 by Murphy; 6,230,661 by Yarnall, Jr. et al; 6,232,874 by Murphy; 6,239,700 by Hoffman et al; 6,292,725 by Kageyama et al; 6,301,551 by Piscalko et al; 6,311,644 by Pugh; 6,320,933 by Grodzins et al; 6,353,390 by Beri et al; 6,362,778 by Neher; 6,388,612 by Neher; 6,404,338 by Koslar; 6,415,742 by Lee et al; 6,421,608 by Motoyama et al; 6,431,122 by Westrick et al; 6,434,372 by Neagley et al; 6,437,743 by Mintz et al; 6,484,079 by Buckelew et al; 6,497,153 by Hoskinson et al; 6,519,530 by Crockett et al; 6,520,715 by Smith; 6,577,141 by Gandrud; 6,600,422 by Barry et al; 6,624,754 by Hoffman et al; 6,657,544 by Barry et al; 6,700,533 by Werb et al; 6,711,535 by Ford et al; 6,718,248 by Lu et al; 6,747,555 by Fellenstein et al; 6,762,684 by Camhi; 6,847,892 by Zhou et al; 6,857,016 by Motoyama et al; 6,859,171 by Durst et al; 6,868,100 by Larson et al; 6,892,131 by Coffee et al; 6,915,216 by Troxler et al; 6,919,803 by Breed; 6,943,701 by Zeineh; 6,961,659 by Motoyama et al; 6,995,667 by He et al; 7,000,570 by Napolez et al; 7,002,472 by Stratmoen et al; 7,015,817 by Copley et al; 7,034,683 by Ghazarian; 7,038,590 by Hoffman et al; 7,061,385 by Fong et al; 7,113,126 by Durst et al; 7,142,167 by Rochelle et al; 7,164,354 by Panzer; 7,164,986 by Humphries et al; 7,171,187 by Haave et al; 7,173,535 by Bach et al; 7,196,621 by Kochis; 7,219,024 by Gamache et al; 7,236,798 by Beuck; 7,239,150 by Troxler et al; 7,313,759 by Sinisi; 7,319,397 by Chung et al; 7,345,588 by Gerig; 7,376,457 by Ross; 7,376,530 by Bienvenu et al; 7,385,499 by Horton et al; 7,394,390 by Gerig; 7,441,516 by Sharpe; 7,468,659 by Haave et al; 7,477,155 by Bach et al; 7,512,493 by Morgan et al; 7,518,522 by So; 7,538,679 by Shanks; 7,554,441 by Viegers et al; 7,663,502 by Breed; 7,664,483 by Annoni et al; 7,707,085 by Sakurai et al; 7,764,228 by Durst et al; 7,786,876 by Troxler; 7,801,506 by Haave et al; 7,822,817 by Motoyama et al; 7,830,257 by Hassell; 7,848,905 by Troxler et al; 7,856,947 by Giunta; 7,920,066 by Troxler; 7,955,513 by Carr; 7,961,094 by Breed; 8,065,074 by Liccardo; 8,112,242 by Troxler; 8,149,110 by Troxler; 8,159,338 by Breed; 8,237,575 by Maclean III et al; 8,274,396 by Gurley et al; 8,291,867 by Blizzard; 8,297,233 by Rich et al; 8,428,913 by Troxler; 8,531,289 by Scalisi et al; 8,571,671 by Shah et al; 8,726,846 by Dutcher et al; 8,726,847 by Gurley et al; 8,838,260 by Pachet et al; 8,955,462 by Golden; 8,957,812 by Hill et al; 9,015,231 by Hodgman et al; 9,072,278 by Chortyk White et al; 9,101,113 by Rich et al; 9,137,971 by Gurley et al; 9,161,515 by Dutcher et al; 9,226,479 by Bianchi et al; 9,265,015 by Aiuto et al; 9,326,486 by Namm; 9,332,734 by Hege; 9,439,396 by Namm; 9,538,329 by Vivathana; 9,552,736 by Taveira; 9,615,545 by Rich et al; 9,640,079 by Moravek et al; 9,648,849 by Vivathana; 9,654,925 by Solinsky et al; 9,674,684 by Mendelson; 9,728,089 by Marcus; 9,848,295 by Mason et al; 9,922,522 by Solinsky et al; 9,924,314 by Solinsky et al; 10,092,203 by Mirov; 10,154,651 by Goetzl et al; 10,182,964 by Snow; 10,231,440 by Seltzer et al; 10,268,220 by McFarland et al; 10,514,439 by Seltzer; 10,645,908 by Seltzer et al; 10,674,709 by Goetzl et al; 10,842,128 by McFarland; 10,918,087 by Respass et al; 10,986,813 by Seltzer et al; 11,109,182 by Floyd et al; 11,238,889 by Seltzer et al; 11,330,803 by Ehrman et al; 11,372,077 by Seltzer et al; 11,394,196 by Olszyk et al; 11,470,814 by Goetzl et al; 11,490,597 by Seltzer et al; 11,553,692 by Goetzl et al; 2001/0026240 by Neher; 2002/0015354 by Buckelew; 2002/0017995 by Touchton; 2002/0152028 by Motoyama et al; 2002/0180618 by Beri et al; 2002/0196151 by Troxler; 2003/0179140 by Patterson et al; 2003/0184450 by Muller et al; 2003/0224772 by Patzer et al; 2004/0036649 by Yaylor; 2004/0108939 by Giunta; 2004/0196182 by Unnold; 2005/0034683 by Giunta; 2005/0035865 by Brennan et al; 2005/0066912 by Korbitz et al; 2005/0143909 by Orwant; 2005/0280546 by Ganley et al; 2006/0027185 by Troxler; 2006/0061469 by Jaeger et al; 2006/0112901 by Gomez; 2006/0191491 by Nottingham et al; 2006/0197672 by Talamas, Jr et al; 2007/0171047 by Goodman et al; 2007/0219705 by Bitar et al; 2007/0229350 by Scalisi et al; 2008/0036594 by Kates; 2008/0036610 by Hokuf et al; 2008/0055154 by Martucci et al; 2008/0156277 by Mainini et al; 2008/0162034 by Breen; 2008/0186167 by Ramachandra; 2008/0186197 by Rochelle et al; 2008/0216766 by Martin et al; 2008/0246656 by Ghazarian; 2008/0278309 by Troxler; 2009/0002188 by Greenberg; 2009/0102668 by Thompson et al; 2009/0267832 by Hymel; 2009/0289844 by Palsgrove et al; 2009/0292426 by Nelson et al; 2009/0325594 by Lan et al; 2010/0033339 by Gurley et al; 2010/0139576 by Kim et al; 2011/0148634 by Putz; 2011/0163873 by McIntosh; 2011/0172916 by Pakzad et al; 2011/0187537 by Touchton et al; 2011/0193717 by Troxler; 2011/0298615 by Rich et al; 2012/0132151 by Touchton et al; 2012/0154154 by Troxler; 2012/0220314 by Altman et al; 2012/0312250 by Jesurum; 2013/0008391 by Berntsen; 2013/0141237 by Goetzl et al; 2013/0157628 by Kim et al; 2013/0226511 by Troxler; 2013/0265165 by So; 2013/0307688 by Hoffman et al; 2013/0324166 by Mian et al; 2014/0020635 by Sayers et al; 2014/0104063 by Troxler; 2014/0120943 by Shima; 2014/0230755 by Trenkle et al; 2014/0232541 by Trenkle et al; 2014/0251233 by Bianchi et al; 2014/0290013 by Eidelman et al; 2014/0302842 by Lloyd et al; 2015/0016730 by Miller et al; 2015/0020750 by Jesurum; 2015/0040839 by Goetzl et al; 2015/0107531 by Golden; 2015/0121535 by Fiss; 2015/0177010 by Abramson et al; 2015/0216142 by Landers et al; 2016/0015004 by Bonge; 2016/0021849 by Loosveld; 2016/0022185 by Agarwal et al; 2016/0026837 by Good et al; 2016/0135431 by Sheldon et al; 2016/0189507 by Rayner; 2016/0195602 by Meadow; 2016/0205898 by Perrine; 2016/0371984 by Macfarlane et al; 2017/0099807 by Northrop et al; 2017/0156294 by Landers et al; 2017/0295143 by Bone et al; 2017/0337826 by Moran et al; 2017/0372580 by Vivathana; 2017/0372581 by Solinsky et al; 2017/0374510 by Solinsky et al; 2018/0055011 by Landers et al; 2018/0184618 by Gotts; 2019/0021283 by Landers et al; 2019/0113625 by Farmer et al; 2019/0120929 by Meadow; 2019/0133084 by Landers et al; 2019/0141951 by Coughlan; 2019/0141953 by Landers et al; 2019/0281794 by Ehrman et al; 2020/0093096 by Blizzard; 2020/0351623 by Eisner; 2021/0045353 by Ehrman et al; 2021/0080595 by Landers; 2021/0084480 by Maier et al; 2021/0190503 by Landers; 2022/0066045 by Farmer et al; 2024/0003690 by Landers; RE 38.910 by Troxler et al; and RE 40,073 by Breed.

In addition to the foregoing patents, Webster's New Universal Unabridged Dictionary, Second Edition copyright 1983, is incorporated herein by reference in entirety for the definitions of words and terms used herein.

SUMMARY OF THE INVENTION

In one manifestation, the invention is, in combination, an animal location training apparatus and a mobile training aid. The animal location training apparatus has: at least one animal stimulation apparatus coupled with an animal and configured to selectively provide stimulation to the animal; a wireless location determination apparatus coupled with the animal and configured to operatively generate current position identifying information representative of a current position of the animal; an electrical processor coupled to the wireless location determination apparatus and operative to receive the current position identifying information therefrom, and responsive thereto to selectively actuate the animal stimulation apparatus to selectively provide the stimulation to the animal; and a communications link enabling wireless communications with the mobile training aid, the communications link configured to communicate the selectively provided stimulation to the mobile training aid. The mobile training aid has: a communications link enabling wireless communications with the animal location training apparatus; a human interactive communications apparatus configured to communicate with a human and emulate the selectively provided stimulation; and a trigger configured to be selectively actuated by a human through the human interactive communications apparatus, and responsive thereto to send an animal stimulation apparatus actuation signal through the mobile training aid communications link to the animal location training apparatus communications link, and responsive thereto selectively actuate the animal stimulation apparatus to provide stimulation to the animal, wherein the trigger isolates the trainer from the animal stimulation and reduces the number of possible stimulations to thereby render the stimulations more consistent and predictable.

OBJECTS OF THE INVENTION

Exemplary embodiments of the present invention solve inadequacies of the prior art by providing a mobile apparatus in real-time communication with a location training apparatus such as a geolocation collar. The mobile apparatus is provided with a trigger or other activator that, when triggered by an operator, isolates the animate being from direct communication or expression by the human operator and still in turn causes the collar or functionally similar apparatus to deliver consistent and predictable training or other particular stimuli to an animate being. In addition, the mobile apparatus is configured to detect and emulate the stimulus of the location training apparatus. This is accomplished in the preferred embodiment by providing a communications link between the geolocation collar and the mobile apparatus to communicate current operation of the geolocation collar, and in geolocation collars so enabled to communicate settings adjustments to the geolocation collar from the mobile apparatus.

The present invention and the preferred and alternative embodiments have been developed with a number of objectives in mind. While not all of these objectives are found in or required of every embodiment, these objectives nevertheless provide a sense of the general intent and the many possible benefits that are available from ones of the various embodiments of the present invention.

A first object of the invention is to provide a mobile training aid apparatus that is in real-time communication with a location training apparatus such as a geolocation collar. A second object of the invention is to provide a simple and intuitive means of stimulating an animate being such as a dog by activating a trigger within the mobile training aid apparatus. As a corollary thereto, embodiments of the present invention will preferably provide a layer of isolation between the emotions of a user or trainer and the generation of the stimulation, such that the stimulus provided is consistent, predictable, understandable, and appropriate for a given situation. An additional object of the invention found in some embodiments is to convert a stimulus from the location training apparatus to visual, auditory, and tactile feedback within the mobile training aid. Another object of the present invention is to enable a person to simply and efficiently set up and operate both the location training apparatus and the mobile training aid. As a corollary, embodiments of the present invention will preferably provide a bidirectional communications channel to communicate current operation of the location training apparatus to the mobile training aid, while also communicating stimulus triggers and settings adjustments from the mobile training aid to the location training apparatus. A further object of the invention is to enable a person to observe the location training apparatus in use, with full knowledge and certainty of the stimulus provided by location training apparatus and the ability to simultaneously observe the effects of the stimulus, allowing the person to more precisely select and control the operation of the location training apparatus to suit a particular animal and the needs and desires of a particular trainer. Yet another object of the invention is to provide all of the functionality of a containment collar, pet tracker, and training aid in one device, thereby avoiding the need for multiple different collars with multiple sets of batteries.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Manifested in the preferred embodiment, the present invention provides a mobile apparatus in real-time communication with a mobile location training apparatus such as a geolocation collar. While not separately illustrated herein, the geolocation collar will preferably comprise a collar such as described and illustrated in the commonly owned patents and published applications incorporated by reference herein above. Nevertheless, other geolocation collars such as illustrated in others of the patents incorporated by reference herein above may also be used, subject to appropriate modifications as will be apparent to those skilled in the art after review of the present disclosure.

In a preferred embodiment of the invention illustrated in FIGS. 1-3 and 5, a mobile training aid 1 comprises a portable computing device. As illustrated, for exemplary and non-limiting purpose, a cellular telephone provides a desired combination of computing, communications, display, sound generation, and vibration generation, though other custom or general purpose apparatuses will be used in alternative embodiments.

Figure 1:
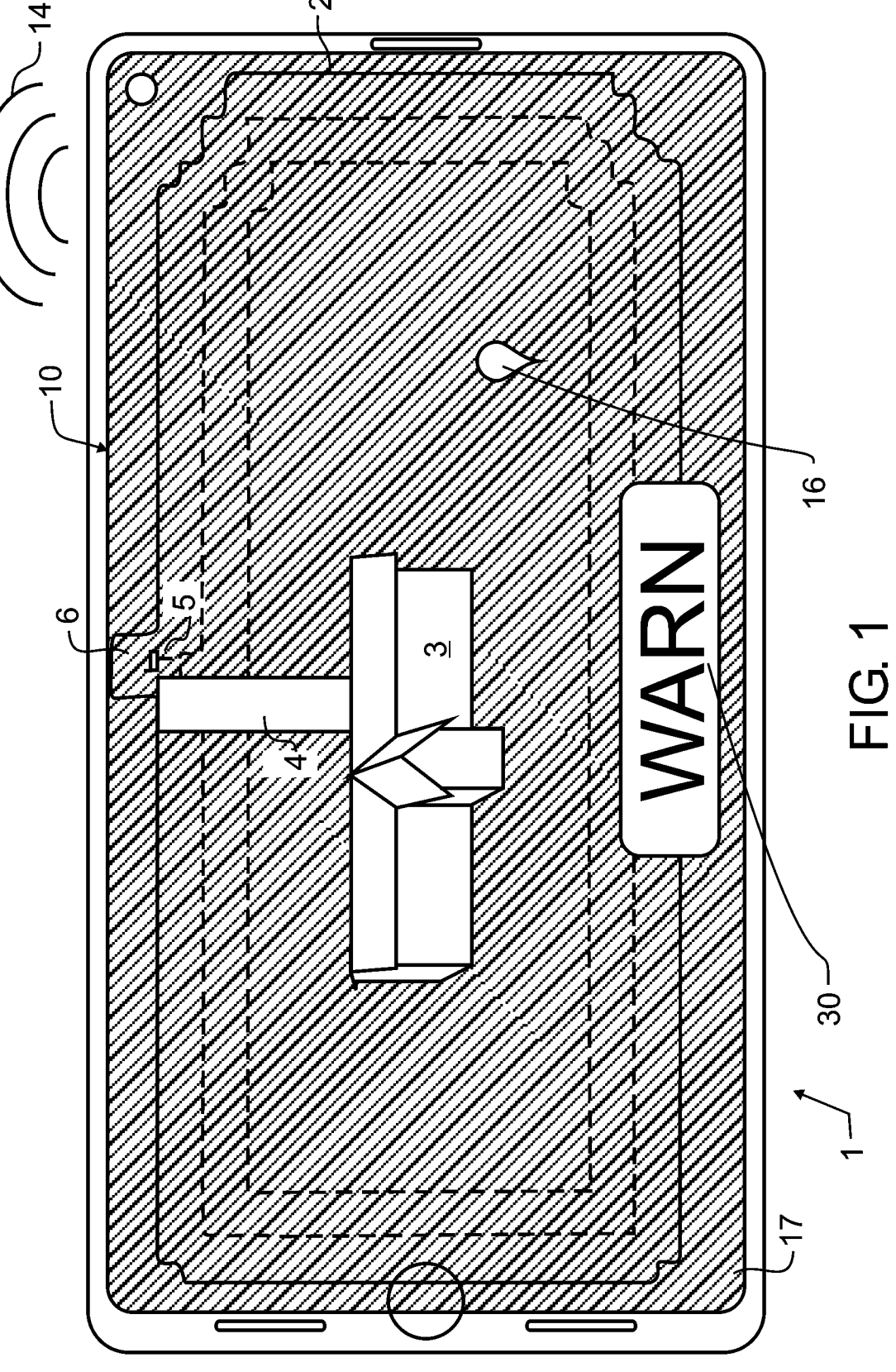
FIG. 1 illustrates a preferred embodiment mobile training aid designed in accord with the teachings of the present invention from front view, with a location training apparatus in an exemplary safe zone.
Figure 2:
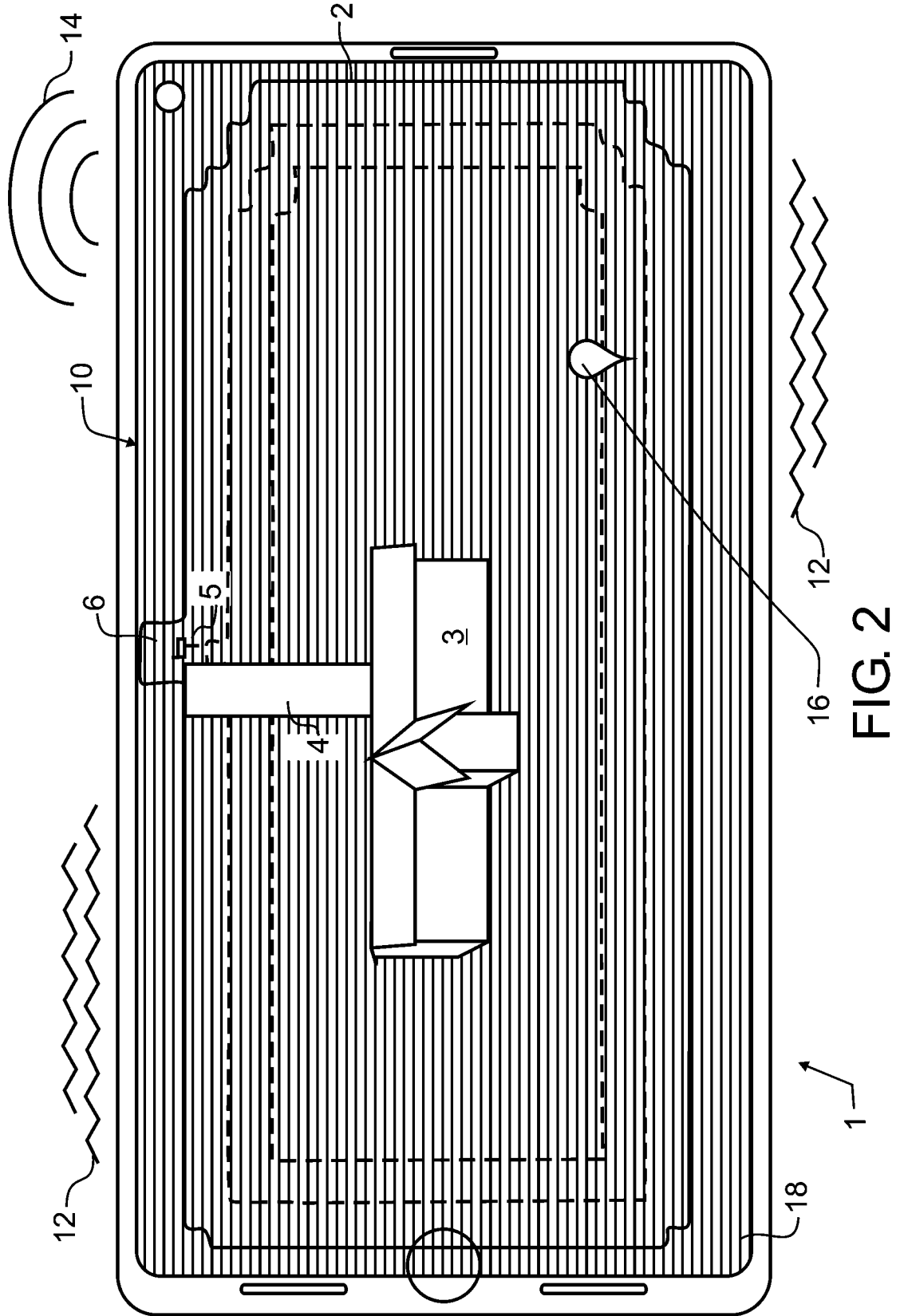
FIG. 2 illustrates the preferred embodiment mobile training aid of FIG. 1, with a location training apparatus in an exemplary first alert zone.
Figure 3:
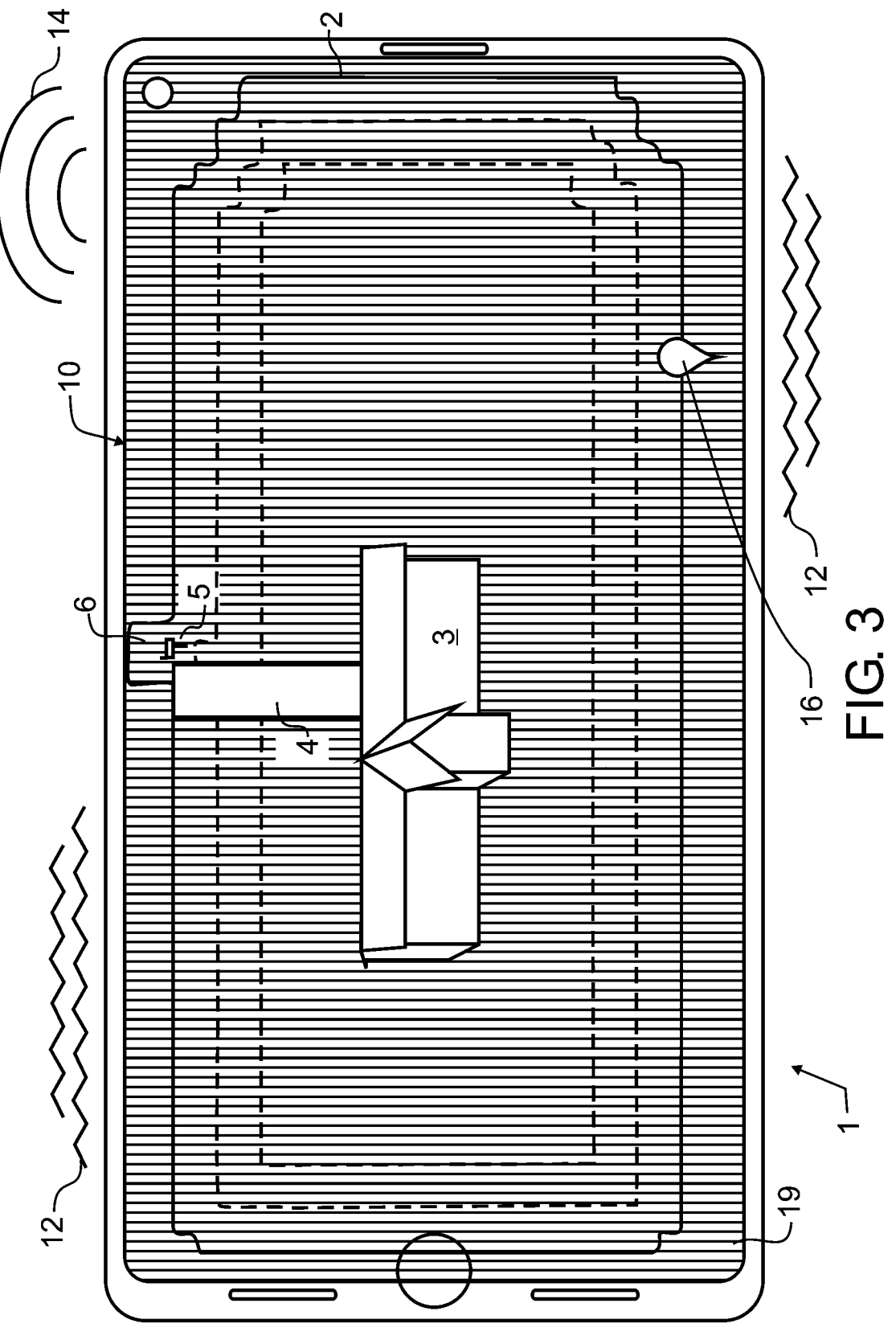
FIG. 3 illustrates the preferred embodiment mobile training aid of FIG. 1, with a location training apparatus in an exemplary out-of-bounds guidance zone.

In the preferred embodiment of the invention illustrated in FIGS. 1-3, for exemplary and non-limiting purposes, a property 2 is displayed within display 10 that includes one or more buildings 3, a driveway 4, and a mailbox 5. If, for exemplary purposes, a pet is or will be trained to walk with the owner to the mailbox, or to retrieve the newspaper from adjacent to the mailbox, then the owner may wish to provide a small peninsula 6 which could extend beyond the bounds of the particular property location.

For exemplary purposes only, and not limiting the present invention thereto, the boundary of property 2 as extended by small peninsula 6 has been mapped to include a plurality of guidance zones as described in the commonly owned patents incorporated herein above by reference. The additional guidance zones, the creation and purpose which are well described in those commonly owned patents, are illustrated herein as dashed lines within property 2.

Location training apparatus 16 will generate different stimulus depending upon which of these zones the apparatus is located within, and further dependent upon the application or purpose for the location training apparatus 16. Again for exemplary and non-limiting purpose, in some embodiments as discussed in the commonly owned patents, the different stimulus may provide positive reinforcement training such as reward tones provided within a safe zone, first alert vibration which is preferably very distinct from the comforting tone of the safe zone, a second alert low level tingling sensation generated through the fur, and an out-of-bounds stronger tingling stimulation coupled with another distinct tone.

In order to verify and control the operation of a location training apparatus 16, whether location training apparatus 16 is one such as illustrated herein and described in the aforementioned commonly owned patents, one such as disclosed in the other prior art patents and published applications incorporated herein above, or other similar apparatus, mobile training aid 1 is coupled through a suitable communications channel with the location training apparatus 16. In the preferred embodiment, the coupling is accomplished using a personal area network (PAN) generated using the Bluetooth Low Energy (BLE) protocol. In alternative embodiments, a wide variety of other known electrical, optical, magnetic, and other wireless communications channels will be used.

When appropriately activated, such as by triggering a switch or by other suitable means, training aid 1 will begin to receive communications from location training apparatus 16, and, responsive thereto, will emulate the stimulus of location training apparatus 16. As illustrated in FIG. 1, if location training apparatus 16 is within a safe zone, this emulation may for exemplary and non-limiting purpose comprise generating a tone 14 resembling the safe zone tone generated by location training apparatus 16. In addition, a green overlay 17 is provided on the screen, which has been illustrated in FIG. 1 by the graphic symbol for the color green as crosshatching sloping from the upper left to the lower right, as approved by the Patent Office in the USPTO "Guide for Patent Draftsmen". One of the benefits of an overlay is the ability to adjust the opacity and intensity of the overlay layer. This means that green may shine brightly, while still allowing a person to see the remaining features such as the position of location training apparatus 16 within property 2. In some alternative embodiments, rather than an overlay the green is provided as a background behind otherwise partially transparent objects or backgrounds.

The sounding of a tone 14 that resembles the safe zone tone generated by location training apparatus 16 allows a person to be in the vicinity of location training apparatus 16 and does not require the person to pay attention to display 10, other than for quick visual confirmation if so desired. This in turn means that the person can watch what effect the generation of the safe zone tone by location training apparatus 16 has. For exemplary and non-limiting purpose, the person may observe a dog that is carrying location training apparatus 16 to see how the dog responds.

In some embodiments, the intensity of one or more types of stimulation will or can be varied by location training apparatus 16. In such embodiments, the intensity of the emulation by mobile training aid 1 will likewise be varied to correspond thereto.

In some instances, a person may wish to trigger the activation of location training apparatus 16. For exemplary and non-limiting purpose, this might occur when the owner and pet are moving about and the pet exhibits a behavior that the owner wishes to discourage. In such case, a remote activated dog collar stimulus is triggered within location training apparatus 16 by a suitable trigger or other activator that, when triggered by an operator, causes the collar or functionally similar apparatus to deliver consistent and predictable training or other particular stimuli to an animate being. Most preferably, the use of a suitable trigger or activator to generate the stimulus in the location training apparatus isolates the animate being from direct communication or expression by the human operator. This will in some instances be vital and critical for proper training and behavioral response. One particular example is when the trainer is particularly excited, such as when a dog is in imminent danger. In the heat of the moment, the trainer might not be able to respond calmly, and may instead yell loudly. When within direct auditory range, this shouting may overwhelm the dog and mask the intended message. When a direct radio link is provided, this shouting will almost always be reproduced as highly garbled and potentially unintelligible speech. In either case, a dog will be left completely confused and unable to properly respond, at the very moment when proper response is most critical.

In the preferred embodiment, the trigger or activation location training apparatus 16 is achieved by the press of button 30 on mobile training aid 1. In the preferred embodiment, the trigger signal generated by mobile training aid 1 is independent of the force applied to button 30, and instead is simply a binary state, either "on" or "off", or stated differently, either "pressed" or "unpressed". In other words, and as just mentioned herein above, while a trainer may exhibit an essentially infinite number of emotions and reactions in any particular moment, mobile training aid 1 reduces the number of possible stimulations to one or a few limited discrete options, and thereby serves as an isolator between the trainer and the animate being, ensuring that the animate being receives consistent stimulus. This means mobile training aid 1 substantially isolates a dog from the much wider range of emotions or adrenalin level of the trainer at any given instant.

While button 30 is labeled with the caption "WARN", it will be understood herein that other captions are provided in alternative embodiments, and that in yet other alternative embodiments, the caption is dynamically updated to correspond to particular circumstances or user selections. For exemplary and non-limiting purpose, a hunting mode might be selected by a user, and when a dog is separated sufficiently from the user, the button will in some embodiments be updated to read "COME!". When the dog is in close range, the button will in some embodiments be updated to read "LEAVE IT!". In some alternative embodiments, more than one button 30 may be provided at a time. Nevertheless, the provision of multiple buttons is not preferred and will only be provided when critical for a particular training mode, since multiple buttons will increase the likelihood of user error that can interfere with the proper training of an animate being, and can lead to undesirable procedural conflicts when two buttons are pressed either instantaneously or within too narrow a sequential time window.

Figure 5:
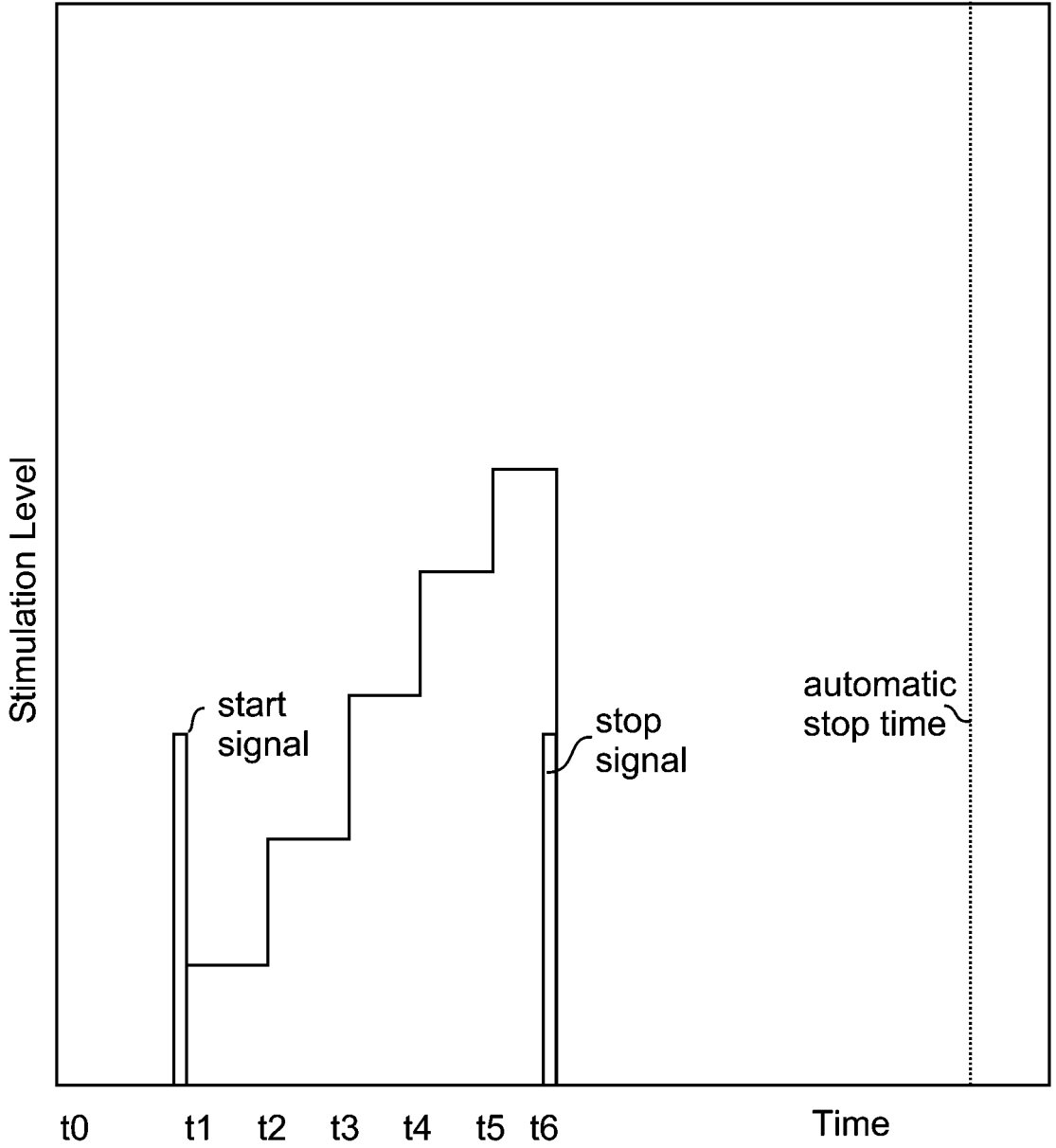
FIG. 5 illustrates a preferred embodiment stimulation ramp designed in accord with the teachings of the present invention and generated within a location training apparatus by remote activation from a mobile training aid such as illustrated in FIGS. 1-4.

When button 30 is pressed, mobile training aid 1 will then wirelessly send a start signal, in some embodiments as a single or short burst transmission to location training apparatus 16. As shown in FIG. 5, the start signal is received by location training apparatus 16 at t1, at which point stimulation is commenced. After a set period of time, the point at which is designated by t2, the stimulation is ramped up to the second level. For the exemplary ramping shown in FIG. 5, this process of increasing stimulation continues through t3, t4, t5, and t6, at which point the stop signal is received and the stimulation stops. In the preferred embodiment, as a safety measure when the stop signal is not received the stimulation will time out after a predetermined period of time. This automatic stop time thereby prevents a constant stimulation from occurring if the dog goes out of range, in event of user error, or if other transmission or device failure occurs.

Either one or both of the type and the intensity of stimulation provided by location training apparatus 16 can be changed at successive ramp steps. Again for exemplary and non-limiting purpose, the initial stimulus provided between t1 and t2 may be of the same type as a first warning zone stimulus at a lowest intensity. In some embodiments, this will be a tone of only moderate volume. When the next time interval between t2 and t3 is exhausted, the intensity of the stimulus may be increased, such as by increasing the volume of the tone. Similarly, when the time interval between t3 and t4 is exhausted, the intensity of the stimulus may be increased once more. For exemplary purpose only, when the time interval between t4 and t5 is exhausted, the type of the stimulus will be changed such as from a tone to a relatively mild vibration. When the time interval between t5 and t6 is exhausted, the intensity of the stimulus may be increased. Instead, and as illustrated in FIG. 5, it is prior to such an increase that the stop signal has been received, and the stimulation generated as a result of pressing button 30 is stopped.

While two increases in intensity are described, followed by a change in stimulation type, the types of stimulation, the number of possible increases in stimulation intensity, and the relative amounts of such increases will in some embodiments be predetermined at design time, and in other embodiments will be user selected or adjusted.

When the signal is sent, mobile training aid 1 will also preferably mimic or otherwise represent the current state of the stimulus that is being generated by location training apparatus 16. For exemplary and non-limiting purpose, the mobile training aid 1 emulation may be in the form of vibrations 12 and/or distinct tones 14.

In the preferred embodiment, stimulation ramps up as long as button 30 is pressed. When button 30 is released, a stop signal is transmitted from mobile training aid 1 to location training apparatus 16, which then stops the stimulation. In some alternative embodiments, the remote activated stimulation illustrated in FIG. 5 is started with a first button 30 press, and ramps up until the next button 30 press.

A short burst transmission signal that designates the start and stop signals is preferable, since this enables a single button 30 to be provided on mobile training aid 1, while minimizing the power transmission required between devices. It is very noteworthy that in many instances, the need to remotely activate location training apparatus 16 will come as a result of at least somewhat of a surprise to the person, and so the simplification of the activation process is highly desirable. Having to choose between two buttons in a tension-filled instant can be very challenging, even for the calmest of owners.

As illustrated in FIG. 2, when location training apparatus 16 is in a first alert zone, it may for exemplary and non-limiting purpose generate a vibration and a distinct first alert tone. In such instances, mobile training aid 1 will preferably: flash a blue overlay 18 within display 10; generate a tone 14 replicating the distinct first alert tone; and generate a vibration 12. The blue overlay 18 has been illustrated in FIG. 2 by the graphic symbol for the color blue as horizontal crosshatching, as approved by the Patent Office in the USPTO "Guide for Patent Draftsmen".

While not separately illustrated, when location training apparatus 16 is in a second alert zone, it may for exemplary and non-limiting purpose generate a low-level tingling electrical stimulation, and sound a distinct second alert zone tone. In such instances, mobile training aid 1 generates a yellow overlay on display 10, and replicates the distinct Second Alert tone on the mobile device. Other than the position of location training apparatus 16, the color of the overlay, and the sound of tone 14, this will appear the same as the illustration of FIG. 1.

When location training apparatus 16 is out-of-bounds, it may for exemplary and non-limiting purpose generate three brief tingling static stimulations and sound a distinct out-of-bounds tone with each stimulation. In such instances, and as illustrated in FIG. 3, mobile training aid 1 flashes a red overlay 19 on display 10 and replicates the distinct out-of-bounds tone 14. The red overlay 19 has been illustrated in FIG. 3 by the graphic symbol for the color red as vertical crosshatching, as approved by the Patent Office in the USPTO "Guide for Patent Draftsmen".

As may be appreciated then, a preferred embodiment mobile training aid 1 designed in accord with the teachings of the present invention includes multi-sensory output to correspond to stimulation generated by a button 30 press, including sounds and vibration. A person training their dog(s) can then know exactly what stimulation is providing in any instant. The multi-sensory feedback is important, since for exemplary and non-limiting purpose it allows a pet owner to observe the dog in action while knowing exactly what the dog is responding to, rather than having to stare at display 10. As a result, dog owners, dog trainers, and others can better, more precisely, and more consistently train dogs. In addition, it allows the dog owners, dog trainers, and others to observe the actual operation of location training apparatus 1, and confirm the operation is in fact as intended and also effective. This includes not only the type and intensity of stimulation provided, but also where the location training apparatus 1 actually triggers.

As may be apparent from a comparison of FIGS. 1, 2, and 3, only FIG. 1 shows the button 30 visible on display 10. This illustrates one embodiment, where button 30 is only available when location training apparatus 16 is within the safe zone and thereby not generating any alert or warning stimuli. This avoids any need to determine whether the zone guidance or button press take priority. However, either in other operating modes or alternative embodiments, button 30 can be provided when location training apparatus 16 is in more locations, or in yet other alternative embodiments button 30 is provided regardless of where location training apparatus 16 is.

Figure 4:
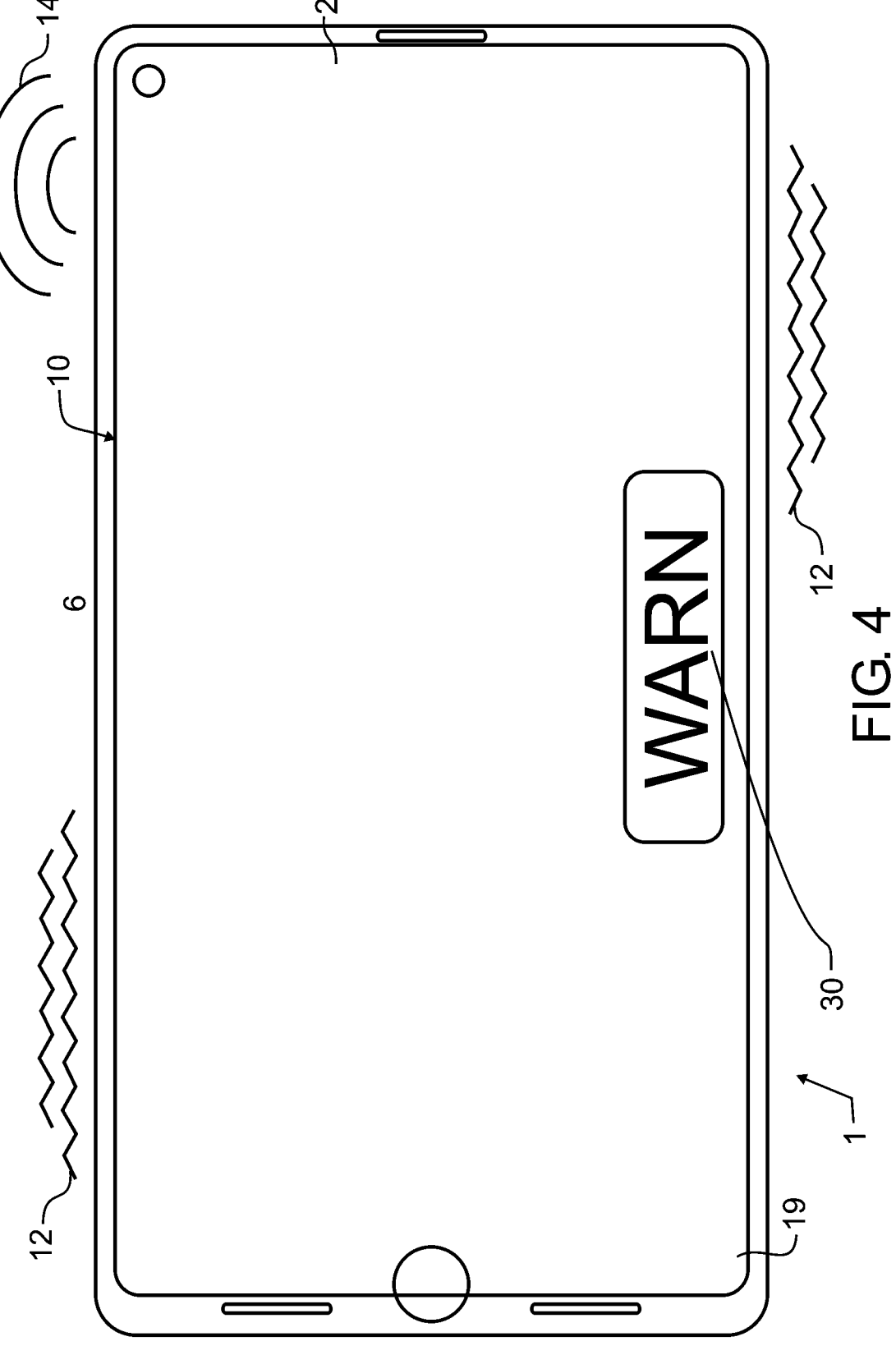
FIG. 4 illustrates a first alternative embodiment mobile training aid.

In a first alternative embodiment illustrated in FIG. 4, mobile training aid 1 only provides a button 30 and no map display. Optionally. feedback of vibrations 12 and tones 14 may also be provided.

In some alternative embodiments, and instead of or in addition to button 30, one or more voice commands are used to trigger a stimulus in location training apparatus 16. As with the pressing of button 30, most preferably independent of the tone or volume of the voice command, the location training apparatus 16 will generate a consistent stimulus. In the exemplary case of a dog, this will isolate the trainer's emotions from the dog training. For exemplary and non-limiting purpose, in some embodiments one voice command is "good dog!" In this case, mobile training aid 1 will trigger the "good dog" stimulation in location training apparatus 16, such as a pleasant tone, to reward the dog. This may be achieved, for exemplary and non-limiting purpose, through the interpretation of the voice command using voice recognition software, and the selective generation of a suitable transmission to location training apparatus 16 responsive thereto.

In some instances, a trainer may need or desire to train multiple dogs, or other animate beings, from one mobile training aid 1. In such instances, the voice command in some embodiments will be expanded. In one exemplary and non-limiting embodiment, the voice command will require the dog's name or moniker to be stated together with a suitable command. Again for exemplary and non-limiting purpose, and using the "good dog" command from herein above, the voice command is "[dog's name], good dog!" In this case, mobile training aid 1 will trigger the "good dog" signal, such as a pleasant tone, to reward the selected dog. Note that [dog's name] is used by mobile training aid 1 to send a signal only to that dog.

Many suitable voice commands will be interpreted as being the equivalent of a press and hold button combination previously described herein above. If the press and hold would then result in a ramp-up of the message, then it will be ramped here as well. However, the trainer/handler's emotions are substantially isolated by voice conversion through the mobile training aid 1, allowing the training/ behavioral stimulus to be consistent and recognizable by the dog. In contrast, prior art systems and apparatus that simply use a voice link directly to the dog will, at least in some cases and with some trainer/handlers, simply be a garbled screaming that is hardly intelligible, even by a trained linguist.

Similarly, the press and hold combination result is also consistent, so even if the trainer/handler is angry and doesn't fully comprehend what direct application of those emotions could result in, the mobile training aid 1 isolates the animal from that inconsistency and delivers the same stimulus as would be desired to get the desired result.

Another exemplary combination is: "[dog's name], leave it!" In this case, the mobile training aid 1 will trigger a signal associated with "leave it!," such as a warning tone or vibration.

Yet another exemplary voice command is: "[dog's name], come!" In this case, the mobile training aid 1 will trigger a signal associated with "come". If the dog starts to return to the trainer/handler, then in some embodiments the collar will switch from the "come" signal such as a particular tone and vibration combination, to a rewarding signal. In some embodiments, the mobile training aid 1 may continue this combination until the dog completely returns to the trainer/ handler, rewarding the dog during movement closer, and reminding the dog with the "come" signal when not. As may be appreciated from the foregoing, the stimulus induced in location training apparatus 16 may be modified based upon both current location and also upon recent prior locations or behaviors.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

We claim:

1. In combination, an animal location training apparatus and a mobile training aid, said animal location training apparatus having:

at least one animal stimulation apparatus coupled with an animal and configured to selectively provide stimulation to said animal;

a wireless location determination apparatus coupled with said animal and configured to operatively generate current position identifying information representative of a current position of said animal;

an electrical processor coupled to said wireless location determination apparatus and operative to receive said current position identifying information therefrom, and responsive thereto to selectively actuate said animal stimulation apparatus to selectively provide said stimulation to said animal; and a communications link enabling wireless communications with said mobile training aid, said communications link configured to communicate said selectively provided stimulation to said mobile training aid;

said mobile training aid having:

a communications link enabling wireless communications with said animal location training apparatus;

a human interactive communications apparatus configured to communicate with a human and emulate said selectively provided stimulation; and a trigger configured to be selectively actuated by a human through said human interactive communications apparatus, and responsive thereto to send an animal stimulation apparatus actuation signal through said mobile training aid communications link to said animal location training apparatus communications link, and responsive thereto selectively actuate said animal stimulation apparatus to provide stimulation to said animal;

wherein said trigger comprises a button; and wherein said button is only displayed through said human interactive communications apparatus when said current position of said animal is within a safe zone and said at least one animal stimulation apparatus is thereby not generating any alert or warning stimuli.

2. The combination animal location training apparatus and mobile training aid of claim 1, wherein said trigger is configured to trigger an increasing stimulation generated within said location training apparatus responsive to an increase in time subsequent to sending said animal stimulation apparatus actuation signal.

3. The combination animal location training apparatus and mobile training aid of claim 2, wherein either one or both of a type and an intensity of said stimulation provided to said animal can be changed at successive ramp steps.

4. The combination animal location training apparatus and mobile training aid of claim 1, wherein said trigger is configured to send a trigger selective deactivation signal through said mobile training aid communications link to said animal location training apparatus communications link, and responsive thereto selectively deactivate said animal stimulation apparatus stimulation provision.

5. The combination animal location training apparatus and mobile training aid of claim 1, wherein said at least one animal stimulation apparatus is configured to selectively deactivate said animal stimulation apparatus stimulation provision responsive to an elapse of a predetermined trigger deactivation time limit subsequent to sending said animal stimulation apparatus actuation signal.

6. The combination animal location training apparatus and mobile training aid of claim 1, wherein said animal stimulation apparatus actuation signal comprises a single one of two possible binary signals.

7. The combination animal location training apparatus and mobile training aid of claim 1, wherein said animal stimulation apparatus actuation signal comprises a short burst transmission.

8. The combination animal location training apparatus and mobile training aid of claim 1, wherein said at least one animal stimulation apparatus ramps up said stimulation provided to said animal while said button is actuated, and when said button is no longer actuated, said mobile training apparatus sends a stop signal to said location training apparatus, which responsive thereto discontinues said stimulation.

9. The combination animal location training apparatus and mobile training aid of claim 1, wherein said at least one animal stimulation apparatus ramps up said stimulation provided to said animal while said button is actuated, and when said button is no longer actuated and subsequently reactuated, said mobile training apparatus sends a stop signal to said location training apparatus, which responsive thereto discontinues said stimulation.

10. The combination animal location training apparatus and mobile training aid of claim 1, wherein a caption for said button is dynamically updated to correspond to particular circumstances.

11. The combination animal location training apparatus and mobile training aid of claim 1, wherein said wireless location determination apparatus is configured to determine an instantaneous latitude-longitude-location of said animal; and wherein said animal location training apparatus further comprises electrically accessible memory containing a two-dimensional array corresponding to longitude and latitude;

a data table that is stored in said memory; and a plurality of guidance zone values stored in said data table, with each guidance zone value stored in said data table identifying a one of a safe zone associated with a first behavioral guidance stimulation, an alert zone circumscribing said safe zone associated with a second behavioral guidance stimulation different from said first behavioral guidance stimulation, and an out-of-bounds zone circumscribing said alert zone associated with a third behavioral guidance stimulation different from said first and second behavioral guidance stimulations;

said electrical processor configured to operatively compare said received current position identifying information to said data table to generate a first represented current position within said data table and to generate a second represented current position that is subsequent to said first represented current position and further configured to vary an output of said at least one animal stimulation apparatus responsive to said second represented current position relative to said first represented current position, and further configured to determine when said animal is outside of said safe zone, and to control an output of said at least one animal stimulation apparatus to provide positive stimulus when said animal is determined to be outside of said safe zone and said second represented current position relative to said first represented current position is indicative of movement toward said safe zone.

12. In combination, an animate being location training apparatus and a mobile training aid, said animate being location training apparatus having:

at least one animate being stimulation apparatus coupled with an animate being and configured to selectively provide stimulation to said animate being;

a wireless location determination apparatus coupled with said animate being and configured to operatively generate current position identifying information representative of a current position of said animate being;

an electrical processor coupled to said wireless location determination apparatus and operative to receive said current position identifying information therefrom, and responsive thereto to selectively actuate said animate being stimulation apparatus to selectively provide said stimulation to said animate being; and a communications link enabling wireless communications with said mobile training aid, said communications link configured to communicate said selectively provided stimulation to said mobile training aid;

said mobile training aid having:

a communications link enabling wireless communications with said animate being location training apparatus;

a human interactive communications apparatus configured to communicate with a human and emulate said selectively provided stimulation; and a trigger configured to be selectively actuated by a human through said human interactive communications apparatus, and responsive thereto to send an animate being stimulation apparatus actuation signal through said mobile training aid communications link to said animate being location training apparatus communications link, and responsive thereto selectively actuate said animate being stimulation apparatus to provide stimulation to said animate being;

wherein said trigger comprises a button; and wherein said button is only displayed through said human interactive communications apparatus when said current position of said animal is within a safe zone and said at least one animal stimulation apparatus is thereby not generating any alert or warning stimuli.

13. An animal location training system, comprising an animal location training apparatus and a mobile training aid, said animal location training apparatus having:

at least one animal stimulation apparatus coupled with an animal and configured to selectively provide stimulation to said animal;

a wireless location determination apparatus coupled with said animal and configured to operatively generate current position identifying information representative of a current position of said animal;

an electrical processor coupled to said wireless location determination apparatus and operative to receive said current position identifying information therefrom, and responsive thereto to selective actuate said animal stimulation apparatus to selectively provide said stimulation to said animal; and a communications link enabling wireless communications with said mobile training aid, said communications link configured to communicate said selectively provided stimulation to said mobile training aid;

said mobile training aid having:

a communications link enabling wireless communications with said animal location training apparatus;

a human interactive communications apparatus configured to communicate with a human and emulate said selectively provided stimulation; and a trigger configured to be selectively actuated by a human through said human interactive communications apparatus, and responsive thereto to send an animal stimulation apparatus actuation signal through said mobile training aid communications link to said animal location training apparatus communications link, and responsive thereto5 selectively actuate said animal stimulation apparatus to provide stimulation to said animal;

wherein said trigger comprises a voice activation apparatus configured to translate preselected commands from voice to said animal stimulation apparatus actuation signal independent of a tone or volume of said voice; and wherein said trigger comprises a button; and wherein said button is only displayed through said human interactive communications apparatus when said current position of said animal is within a safe zone and said at least one animal stimulation apparatus is thereby not generating any alert or warning stimuli.

14. The animal location training system of claim 13, wherein said voice activation apparatus further comprises target animal selective commands, wherein a target animal is designated by a name spoken by said voice.

15. The animal location training system of claim 13, wherein said animal location training apparatus electrical processor is configured to detect whether the animal has started to respond to said stimulation, and, if so, to alter said stimulation to said animal responsive thereto.

* * * * *